(12) United States Patent
Matsushima

(10) Patent No.: US 8,567,861 B2
(45) Date of Patent: Oct. 29, 2013

(54) SEAT WITH HEATER

(75) Inventor: Masaaki Matsushima, Shizuoka (JP)

(73) Assignee: TS Tech Co., Ltd., Tochigi (JP)

( * ) Notice: Subject to any disclaimer, the term of this patent is extended or adjusted under 35 U.S.C. 154(b) by 170 days.

(21) Appl. No.: 12/977,429

(22) Filed: Dec. 23, 2010

(65) Prior Publication Data

US 2011/0156453 A1 Jun. 30, 2011

(30) Foreign Application Priority Data

Dec. 25, 2009 (JP) ................................ 2009-295454
Dec. 25, 2009 (JP) ................................ 2009-295455

(51) Int. Cl.
  *A47C 7/74* (2006.01)
  *B60N 2/40* (2006.01)

(52) U.S. Cl.
  USPC ................................ 297/180.12; 297/195.12

(58) Field of Classification Search
  USPC ......................................... 297/180.12, 195.12
  See application file for complete search history.

(56) References Cited

U.S. PATENT DOCUMENTS

| 7,178,866 B1 * | 2/2007 | Scott ......................... 297/180.12 |
| 2004/0032153 A1 * | 2/2004 | Atherley ................... 297/195.12 |
| 2004/0036325 A1 * | 2/2004 | Diemer et al. ........... 297/180.12 |
| 2008/0179306 A1 * | 7/2008 | Howick et al. ................ 219/201 |

FOREIGN PATENT DOCUMENTS

| JP | 2003127947 | | 5/2003 |
| JP | 2005279070 | | 10/2005 |
| WO | WO99/58023 | * | 11/1999 |
| WO | WO2007/018271 | * | 2/2007 |

* cited by examiner

*Primary Examiner* — David Dunn
*Assistant Examiner* — Timothy J Brindley
(74) *Attorney, Agent, or Firm* — Schiff Hardin LLP

(57) ABSTRACT

A seat comprises a cushion member, a seat heater, and a skin material. The seat heater has a planar base member disposed on the cushion member, a heater wire fixed to the base member, and a temperature control that controls the temperature of the heater wire. The skin material covers both the cushion member and the seat heater. The cushion member includes a seat cushion surface portion for a sitting person and a recess formed in a surface located on the side opposite to the seat cushion surface portion. The base member includes a seat cushion surface-side portion disposed on the seat cushion surface portion. The heater wire includes a seat cushion surface-side heater wire disposed in the seat cushion surface-side portion and an insertion portion heater wire extended from the seat cushion side heater wire. At least a part of the temperature control is connected to the insertion portion heater wire and is disposed within the recess of the cushion member.

10 Claims, 11 Drawing Sheets

(a)

(b)

SEAT WITH HEATER

BACKGROUND OF THE INVENTION

1. Technical Field

The present disclosure relates to a seat, and more particularly to a seat capable of reducing a load imposed on a temperature control means of a seat heater.

2. Related Art

Heretofore, at a low atmospheric temperature for example in winter, there has been the problem that, when a person sits on a seat, the seat temperature is low and does not feel comfortable. In view of this point, there has been developed a technique of disposing a seat heater in the seat. By disposing a seat heater not only in a seating portion (seat cushion surface portion) against which the hip of a sitting person comes into abutment but also in a backrest surface which bears the waist of the sitting person, the feeling when the person sits thereon is improved.

As noted above, the seat heater is provided, for example, for the retention of heat and for the prevention of freezing. The seat heater is a planar heating unit capable of heating the seat by means of a heating wire embedded in the seat cushion surface portion of the seat and thereby the feeling when a person sits thereon is improved.

Examples of seats for which such a seat heater is required are seats disposed in sofas, massage chairs and vehicles such as automobiles, motorcycles and snowmobiles. Particularly, in straddling type vehicles such as motorcycles and snowmobiles, riders are directly influenced by environmental conditions such as temperature and wind, unlike the seats used in the other cases, and therefore especially in cold districts, the seat heater is very important. With a vehicle seat heater provided not only in the seat surface on which a person sits but also in the backrest surface which bears the waist of the sitting person, the feeling when the person sits thereon is improved.

In Japanese Patent Application Publication No. 2003-127947 there is disclosed a technique such that, in a seat having a cushion member covered with a skin material, a tape is disposed on the surface of the skin material and a cord type or film type heater (seat heater) is disposed between the tape and the skin material.

In Japanese Patent Application Publication No. 2005-279070 there is disclosed a technique such that, in a seat comprising a front seat and a backrest for bearing the waist of a sitting person on a rear side of a vehicle body with respect to the front seat, a seat heater for the front seat and a seat heater for the backrest are each disposed on an upper surface of a cushion member and covered with a skin material. Heater wires are disposed meanderingly in the longitudinal direction of the vehicle body so as to be substantially right-left symmetric on both sides of a nearly central part of a base cloth corresponding to a longitudinally extending central part of the vehicle body.

SUMMARY OF THE DISCLOSURE

In the seat heater described in Japanese Patent Application Publication No. 2003-127947, in connection with its temperature control means (controller), a sensor is provided in the tape disposed on the seat surface so as to sense an electric current supplied to the heater. In such a seat, however, the load of a sitting person shifts frequently while a vehicle is traveling, for example, with a large load being imposed on the seat. As a result, the sensor provided in the seat cushion surface portion is apt to be damaged.

In the seat heater described in Japanese Patent Application Publication No. 2005-279070, end portions of the heater wires are drawn out to the exterior of the seat and are connected to a battery and an operation switch in the exterior. In the publication, disclosed is a configuration concerned with an operation control means for controlling On/Off states of the seat heater, like a battery and an operation switch.

However, Japanese Patent Application Publication No. 2005-279070 does not describe a configuration related to a temperature control means such as a thermistor. Generally, a temperature control means is disposed on a seat cushion surface portion (in a range where a person sits on and between the skin material and the cushion member). Therefore, not only does the temperature control means experience a load of a sitting person and is apt to be damaged, but also when a person sits on a seat provided with a seat heater, there occurs unevenness and hence the feeling when the person sits thereon is not comfortable.

In the vehicle seat heater described in Japanese Patent Application Publication No. 2005-279070, it is necessary to separately attach two vehicle seat heaters to the cushion member and to wire each seat heater. Thus, there has been the inconvenience that the installation work is very complicated. There has been an additional problem that the number of parts increases because two seat heaters are required for warming the front seat and the backrest.

Considering the number of parts and the installation work, it is desired that the seat heater disposed in the seat cushion surface portion and the seat heater disposed in the backrest be made integral to each other. However, when both seat heaters are made integral to each other, the seat heater disposed in the seat cushion surface portion is pulled by a load of a sitting person applied to the seat cushion surface portion, and this pulling force is transmitted to the seat heater. As a result, the seat heater may be deformed.

Moreover, in the vehicle seat heater disclosed in Japanese Patent Application Publication No. 2005-279070, when a stretching force acting in the transverse direction of a vehicle body is exerted on a base cloth, since plural heater wires are disposed nearly rectilinearly in the transverse direction of the vehicle body, the heater wires cannot deform themselves transversely of the vehicle body, and only the portion of the base cloth to which the heater wires are not fixed is stretched in the transverse direction of the vehicle body. Thus, the vehicle seat heater disclosed in Japanese Patent Application Publication No. 2005-279070 has involved the inconvenience that the heater does not easily follow stretching deformations of the skin material and the cushion member in the transverse direction of the vehicle body when a person sits on the seat.

The seat disclosed herein in one embodiment solves the above-mentioned problems and includes a seat having a seat heater in which damage to and failure of a temperature control of the seat heater are prevented even when a load of a sitting person is imposed on the seat. Further, the seat has a seat heater in which an uncomfortable feeling because of the seat heater is eliminated and thus a comfortable feeling is provided when a person sits thereon.

Furthermore, a vehicle seat has a vehicle seat heater such that the transfer of a pulling force developed in a seat heater installed in a seat cushion surface portion to a seat heater installed in a backrest surface portion is suppressed while both seat heaters are made integral to each other. Moreover, in a straddling type vehicle, a seat is capable of coping with load characteristics at various portions of the vehicle and is capable of withstanding a largely varying stretching load in a state where a person sits on the seat.

The above problems can be solved by a seat comprising a cushion member; a seat heater having a planar base member disposed on the cushion member, a heater wire fixed to the base member, and a temperature control that controls the temperature of the heater wire; and a skin material that covers both the cushion member and the seat heater. The cushion member includes a seat cushion surface portion that receives a sitting person and a recess formed in a surface located on the side opposite to the seat cushion surface portion. The base member of the seat heater includes a seat cushion surface side portion disposed on the seat cushion surface portion. The heater wire includes a seat cushion surface side heater wire disposed in the seat cushion surface side portion and an insertion portion heater wire extended from the seat cushion surface side heater wire. At least a part of the temperature control is connected to the insertion portion heater wire and is disposed within the recess of the cushion member.

Generally, in a seat having a seat heater, the seat heater is disposed on a cushion member and on a seat cushion surface side on which a person sits, namely, on a seat cushion surface portion of the cushion member. According to the related art, a temperature control of the seat heater is disposed on the seat cushion surface portion integrally with the heater portion. Consequently, there has been the problem that a load of a sitting person is imposed on the temperature control, and thus a connection between the temperature control and a heater wire, as well as the temperature control itself are apt to be damaged. On the other hand, a seat heater of the seat disclosed below includes not only the seat cushion surface side portion disposed at the sitting position of a person but also an insertion portion heater wire extended from the seat cushion surface side portion. Since the insertion portion heater wire is connected to the temperature control, the temperature control can be disposed at a position other than the position against which the hip of a sitting person comes into abutment, namely, the position under the seat cushion surface portion, more specifically, within a recess formed on the side opposite to the seat cushion surface portion of the cushion member. Therefore, the temperature control is protected from a direct load of a person sitting on the seat. Further, since the temperature control is disposed within the recess portion, it does not undergo any interference from the surface located on the side free from abutment of a sitting person, namely, the surface located on the side opposite to the seat cushion surface portion, so that the seat heater temperature control is prevented from damages. As a result, it is possible to provide a seat having a seat heater in which failure is suppressed. Moreover, by disposing the temperature control within the recess, a spatial restriction is eased and a space is greatly saved. Further, since the temperature control is disposed at a position other than the position at which a person sits, the sitting person is free from an uncomfortable feeling because of abutment of the body (the hip and the waist) of the person against the temperature control. Consequently, a seat which can provide a comfortable feeling when a person sits thereon is provided.

Preferably, in another embodiment, the cushion member has a through hole extending in the thickness direction of the cushion member, and the insertion portion heater wire is inserted through the hole. With the seat of such a configuration, since the cushion member is interposed between a sitting person and the seat heater temperature control, a load of a sitting person imposed on the temperature control can be further reduced or mitigated. Moreover, with the configuration in which a hole is formed in the cushion member and the temperature control and the insertion portion heater wire are inserted through the hole, the insertion portion heater wire can be made short, and the insertion portion heater wire can be protected by the cushion member. Consequently, a seat having a seat heater in which the temperature control is less likely to be damaged can be provided.

Preferably, in another embodiment, the recess is positioned below the hole and has a wall which forms at least a part of the recess, and the temperature control is disposed in abutment against the wall. Further, since a hole is formed through the cushion member in a manner that it extends in the thickness direction of the cushion member from the seat heater-disposed position on the cushion member, namely, from the seat cushion surface portion, the temperature control and the insertion portion heater wire are disposed below the cushion member without being twisted. Therefore, no load is imposed on the connection between the temperature control and the insertion portion heater wire and hence damage is reduced. Accordingly, a seat having a seat heater is less likely to be damaged.

Preferably, in another embodiment, the temperature control includes at least any one of a thermistor for detecting the temperature of the seat heater, a controller that controls the temperature of the seat heater, and a breaker for preventing overheating of the seat heater, and at least either of the thermistor and the controller as well as the breaker is disposed within either of recesses formed with a space to each other. In the seat having a seat heater as disclosed below, because of a breaker, even when excess current flows in the heater wire, the current can be cut off with the breaker and, therefore, a seat is protected from failure. In the seat having a seat heater as disclosed below, any of a thermistor, a controller and a breaker is disposed dividedly from the each other. In the case where the thermistor, controller and breaker are integrally disposed, it is necessary to ensure a large space for disposing the temperature control. However, by disposing those devices dividedly, if there is a relatively small space in each associated place, the associated temperature control can be disposed in that space. Thus, when mounting the temperature control, there is little restriction on its installation space. Therefore, the spaces for disposing the temperature control can be saved, and a seat having a seat heater with reduced space restriction is provided for installation of the temperature control. In the case where the seat having a seat heater is mounted on a vehicle, especially on a straddling type vehicle, if the required devices are disposed dividedly at right and left positions of the vehicle, there is no fear of the center of gravity being offset to one side, and operability is improved while the vehicle is travelling. The temperature control may include all of the thermistor for detecting the temperature of the seat heater, the controller that controls the temperature of the seat heater, and the breaker for preventing overheating of the seat heater.

Preferably, in another embodiment, the above seat is a straddling type seat further including a support member for supporting the cushion member on the side opposite to the seat cushion surface portion, and the temperature control is disposed in a recess formed in the cushion member and the support member. Thus, since the seat heater temperature control used especially for a vehicle is disposed within a recess in the cushion member, a load of a sitting person is cushioned through the cushion member; besides, with the support member such as a bottom plate, the temperature control is protected against a shock from the vehicle body side. With the above configuration, moreover, since the cushion member, the seat heater and the skin material are integrally formed on the support member, the effort of a seat on the vehicle body becomes easier. Further, since a recess portion is formed between the cushion member and the support member, vibration transmission from the vehicle to a sitting person as well as noise are suppressed.

The foregoing problems can be solved by a seat comprising a cushion member; a seat heater having a planar base member disposed on the cushion member, a heater wire fixed to the base member, and a temperature control that controls the temperature of the heater wire; and a skin material for covering both of the cushion member and the seat heater. The seat heater is a seat built-in type vehicle seat heater disposed between the cushion member and the skin material covering the cushion member from above. The cushion member includes a seat cushion surface portion for a sitting person, a recess formed in a surface located on the side opposite to the seat cushion surface portion, and a backrest surface portion for bearing the waist of the sitting person on a vehicle body rear side of the seat cushion surface portion. The base member of the seat heater includes a seat cushion surface side portion disposed on the seat cushion surface portion, a backrest surface side portion disposed on the backrest surface portion, and a connection surface portion disposed between the seat cushion surface side portion and the backrest surface side portion and connecting the seat cushion surface side portion and the backrest surface side portion to each other, the components of the base member being formed integrally. The heater wire comprising a seat cushion surface side heater wire disposed in the seat cushion surface side portion, an insertion portion heater wire extended from the seat cushion surface side heater wire, a backrest surface side heater wire disposed in the backrest surface side portion, and a connection heater wire disposed in the connection surface portion to connect the seat cushion surface side heater and the backrest surface side heater electrically to each other. At least a portion of the temperature control is connected to the insertion portion heater wire and is disposed within the recess of the cushion member. The connection surface portion includes a transfer suppresser that suppresses the transfer of a pulling force imposed on the seat cushion surface side portion upon shift of a load of the sitting person to the backrest surface side portion.

According to the above configuration, in a seat built-in type vehicle seat heater disposed in the seat cushion surface portion and the backrest surface portion of the cushion member, the seat cushion surface side portion of the base member disposed on the seat cushion surface portion, the backrest surface side portion of the base member disposed on the backrest surface portion, and the connection surface portion of the base member connecting the seat cushion surface side portion and the backrest surface side portion to each other are formed integrally. The connection surface portion has the transfer suppresser that suppresses the transfer of a pulling force imposed on the seat cushion surface side portion upon a load shift of a sitting person toward the backrest surface side portion. Therefore, even if a pulling force is developed in the seat heater installed in the seat cushion surface portion upon a load shift of a sitting person, it is possible to suppress the transfer of the pulling force to the seat heater in the backrest surface portion, and hence it is possible to prevent deformation of the seat heater. Thus, durability is improved while the seat cushion surface side portion and the backrest surface side portion of the seat heater are integrally formed to each other.

In the above configuration, it is preferable that the transfer suppresser be disposed between the seat cushion surface portion and the backrest surface portion. By thus disposing the transfer suppresser and the connection surface portion having the transfer suppresser between the seat cushion surface portion and the backrest surface portion of the cushion member, the transfer suppresser and the connection surface portion can each be installed at a position little influenced by contact with a sitting person, and hence the durability of the seat heater is improved.

Preferably, in another embodiment, the transfer suppresser is disposed in a space for pulling over the skin material provided on the cushion member. By thus disposing the transfer suppresser in a space for pulling over the skin material provided on the cushion member, the transfer suppresser and the connection surface portion having the transfer suppresser can each be disposed at a position spaced away inwards from the surface of the cushion member by utilizing the skin material pulling-over space. In such a configuration, the transfer suppresser and the connection surface portion having the transfer suppresser are little influenced by contact with a sitting person, so that durability of the seat heater is improved. In addition, it is possible to effectively utilize the skin material pulling-over space.

Preferably, in another embodiment, the seat cushion surface side portion is formed in a trapezoidal shape. The seat cushion surface portion of the cushion member is formed so that the width between both-side edges in the transverse direction of the vehicle body becomes larger from the front side toward the rear side of the vehicle body. Therefore, by forming the seat cushion surface side portion of the base member in a trapezoidal shape conforming to the shape of the seat cushion surface portion, a heating area of the seat cushion surface portion, which area is located on the front side of the vehicle body, is diminished, and a heating area located on the rear side of the vehicle body, namely, an area where the hip of a sitting person is positioned, is sufficient so that the seat cushion surface portion can be warmed efficiently and the comfortable feeling of a sitting person is enhanced.

Preferably, in another embodiment, the above seat is a straddling type seat, and the seat cushion surface side heater wire is partially disposed along side edges of the seat cushion surface side portion. The straddling type seat is in many cases for outdoor use and so it is desired that the seat be warmed in a more efficient manner. If a part of the seat cushion surface side heater wire is thus disposed along side edges of the seat cushion surface side portion, it is possible to form a heater area conforming to the shape of the base member of the seat heater, whereby effectively warm the hip of a sitting person.

Preferably, in another embodiment, the recess is formed at an outside position in the seat width direction, and the transfer suppresser is disposed at an inside position in the seat width direction with respect to the recess. By thus forming the recess in a position other than near the center in the seat width direction in which a load of a sitting person is apt to be imposed on the recess, that is, by forming the recess outside in the seat width direction, the temperature control disposed within the recess can easily be protected from a load of a sitting person. Further, since the recess is formed in a position other than the position apt to undergo a load of the sitting person, the cushion member does not largely deflect when a person sits thereon, but has an appropriate repulsive force, thus the comfortable feeling when a person sits thereon is enhanced.

The foregoing problems can be solved by a seat comprising a cushion member; a seat heater having a planar base member disposed on the cushion member, a heater wire fixed to the base member, and a temperature control that controls the temperature of the heater wire; and a skin material for covering both of the cushion member and the seat heater, the seat heater being a vehicle seat heater. The cushion member is formed in a straddling type and including a seat cushion surface portion for a sitting person, a recess formed in a surface located on the side opposite to the seat cushion surface portion, and a backrest surface portion for bearing the waist of the sitting person on a vehicle body rear side of the seat cushion surface portion. The base member of the seat heater includes a seat cushion surface side portion formed as a planar stretchable surface and disposed on the seat cushion surface portion, and a backrest surface-side portion disposed on the backrest surface portion. The heater wire comprises a seat cushion surface side heater wire fixed substantially throughout the whole area of the base member and disposed in the seat cushion surface side portion, an insertion portion heater wire extended from the seat cushion surface side heater wire, and a backrest surface side heater wire disposed in the backrest surface side portion. At least a portion of the temperature control is connected to the insertion portion heater wire and is disposed within the recess of the cushion member. The seat cushion surface side heater wire includes a plurality of first extending portions and a side portion for connecting ends of the first extending portions to each other. The backrest surface side heater wire includes a plurality of second extending portions, the second extending portions being extended upwards of a vehicle body in a substantially right-left symmetric wavy shape and spaced a predetermined distance to each other. The first and second extending portions are disposed so that the distance between mutually closest portions of the first extending portions is smaller than the distance between mutually closest portions of the second extending portions.

In the above configuration, the heater wire in the seat cushion surface portion is disposed so that a wavy shape, i.e., a mountain portion and a valley portion, is continuous. Therefore, when a stretching force acts on the base member in both transverse and longitudinal directions of the vehicle body, the heater wire is also stretched following a stretching deformation of the base member, so that the seat cushion surface portion of the vehicle seat heater can be deformed smoothly in both transverse and longitudinal directions of the vehicle body. Thus, the vehicle seat heater can be deformed smoothly in any of transverse and longitudinal directions of the vehicle body, so even when a transverse load and a longitudinal load with respect to the vehicle body are applied to the vehicle seat, for example when a person gets on the vehicle or while a vehicle is traveling, the vehicle seat heater can be stretched and deformed smoothly as to follow stretching and deformation of the skin material and the cushion member. Generally, in a vehicle seat on which a sitting person moves frequently in the vertical direction due to unevenness of a road surface, for example, a vertical stretching load is especially apt to act on the backrest surface portion of the seat. On the other hand, when the heater wire disposed in the backrest surface portion is disposed in a wavy shape in the vertical direction, the heater wire in the backrest surface portion can be deformed smoothly in the vertical direction and hence high durability against a vertical stretching load is obtained. Also, the heater wires in the seat cushion surface portion and the backrest surface portion may be disposed so that their densities, i.e., heat wire spacing, are different from each other. In the seat cushion surface portion against which the sitting person's hip and legs come into abutment, since a larger vertical load is exerted thereon, it is necessary to narrow the heater wire spacing and thereby enhance the strength against the stretching load. On the other hand, as to the backrest surface portion, since it comes into abutment against the sitting person's waist, there are fewer cases where a large load acts thereon compared to the seat cushion surface portion. Therefore, in the seat cushion surface portion, in order to permit easier stretching against a vertical stretching load, the heater wires are disposed so as to widen their spacing. By thus disposing the heater wires in the seat cushion surface portion and the backrest surface portion so that their extending directions and spaces are different from each other, it is possible to cope with load characteristics dependent on various portions. As a result, it is possible to improve the feeling when a person sits on the vehicle seat, and hence it is possible to not only provide a sitting person with a comfortable feeling but also surely enhance the stretching strength of the vehicle seat heater. Thus, at various portions (seat cushion surface portion, backrest surface portion, connection surface portion, insertion portion) of the vehicle seat heater with different load characteristics respectively, those portions can be stretched in various directions, so that not only the stretching strength of the whole of the vehicle seat heater can be improved, but also it is possible to realize a comfortable ride.

Preferably, in another embodiment, the cushion member is provided between the seat cushion surface portion and the backrest surface portion with a pulling-over slot for pulling over the base member, the base member further includes a connection surface portion disposed between the seat cushion surface side portion and the backrest surface side portion and attached in a bent state to the pulling-over slot, the heater wire further includes a plurality of connection heater wires connecting the seat cushion surface side heater wire and the backrest surface side heater wire electrically to each other, the connection heater wires being fixed to the connection surface portion, and the heater wire is disposed so that the distance between mutually closest portions of the connection heater wires is larger than the distance between mutually closest portions of the first extending portions. Thus, the vehicle seat heater is attached to the cushion member in a bent state of the connection surface portion of the base member. That is, in the vehicle seat heater, a slack portion is formed because of the bent connection surface portion. The slack portion prevents a state in which the vehicle heat heater is always fixed in a tensed state to the cushion member. Therefore, even when a sudden stretching force acts on the vehicle seat heater during a vehicle is traveling, for example, a local stretching of the vehicle seat heater is prevented because of the connection surface portion (the slack portion). Moreover, since the connection heater wires which connect the seat cushion surface side heater wire and the backrest surface side heater wire to each other are provided in the connection surface portion where warming of the vehicle seat is not required, the wiring quantity of the connection heater wires can be set to a minimum required value. Consequently, it is possible to eliminate inconveniences such as a local stretching of each heater wire connection which occurs when the connection surface portion of the base member is bent. Since the heater wire spacing in the connection surface portion is larger than that in the seat cushion surface portion, it is possible to ensure the stretchability of the heater wires in the connection surface portion. Therefore, it is possible to provide a vehicle seat having stretching characteristics different among the seat cushion surface portion, the connection surface portion, and the backrest surface portion. As a result, the stretching strength of the whole of the vehicle seat heater can remarkably be improved. Besides, all that is required for warming both of the seat cushion surface portion and the backrest surface portion is a mere mounting of the vehicle seat heater having an integral combination of the seating-side portion and the backrest surface side portion to the cushion member, and it is possible to reduce the number of wiring connections involved in the mounting of the vehicle seat heater, so that the mounting work is simplified. Moreover, since one vehicle seat heater is enough for warming both of the seat cushion surface portion and the backrest surface portion, the number of parts is reduced.

Preferably, in another embodiment, the base member further includes an insertion portion extended backwards of the vehicle body from the seat cushion surface side portion, with the temperature control that controls the heater wire temperature being attached to the insertion portion, the insertion portion being inserted into the cushion member, and the insertion portion heater wire being fixed to the insertion portion and extended backwards of the vehicle body in a wavy shape. Thus, since the heater wire is fixed in a wavy shape along the extending direction of the insertion portion with the temperature control secured thereto, even if a load is applied to the heater wire by the own weight of the temperature control provided in the vehicle seat heater and the movement of a sitting person in a state where the insertion portion is inserted into the cushion member, the strength against the stretching load is improved because the heater wire is stretchable. Accordingly, also in the other portion than the seat cushion surface portion, the backrest surface portion, and the connection surface portion, that is, in the insertion portion wherein the temperature control is installed, the strength against the stretching load peculiar to that portion (the insertion portion) is improved.

Preferably, in another embodiment, the second extending portions are each disposed obliquely so that the distance of spacing in the transverse direction of the vehicle body becomes narrower from a lower portion toward an upper portion of the vehicle body. By thus disposing heater wires obliquely in the backrest surface portion, the stretchability can be ensured against not only a vertical load but also a transverse load. Even when loads acting in the vertical and transverse directions of the vehicle body are applied to the vehicle seat heater from the waist of the sitting person, the vehicle seat heater can be deformed smoothly in any direction.

DETAILED DESCRIPTION OF THE INVENTION

An embodiment of the present invention will be described below with reference to the drawings. It goes without saying that the members and arrangements to be described do not limit the present invention, but that various modifications may be made in accordance with the gist of the invention.

Figure 1:
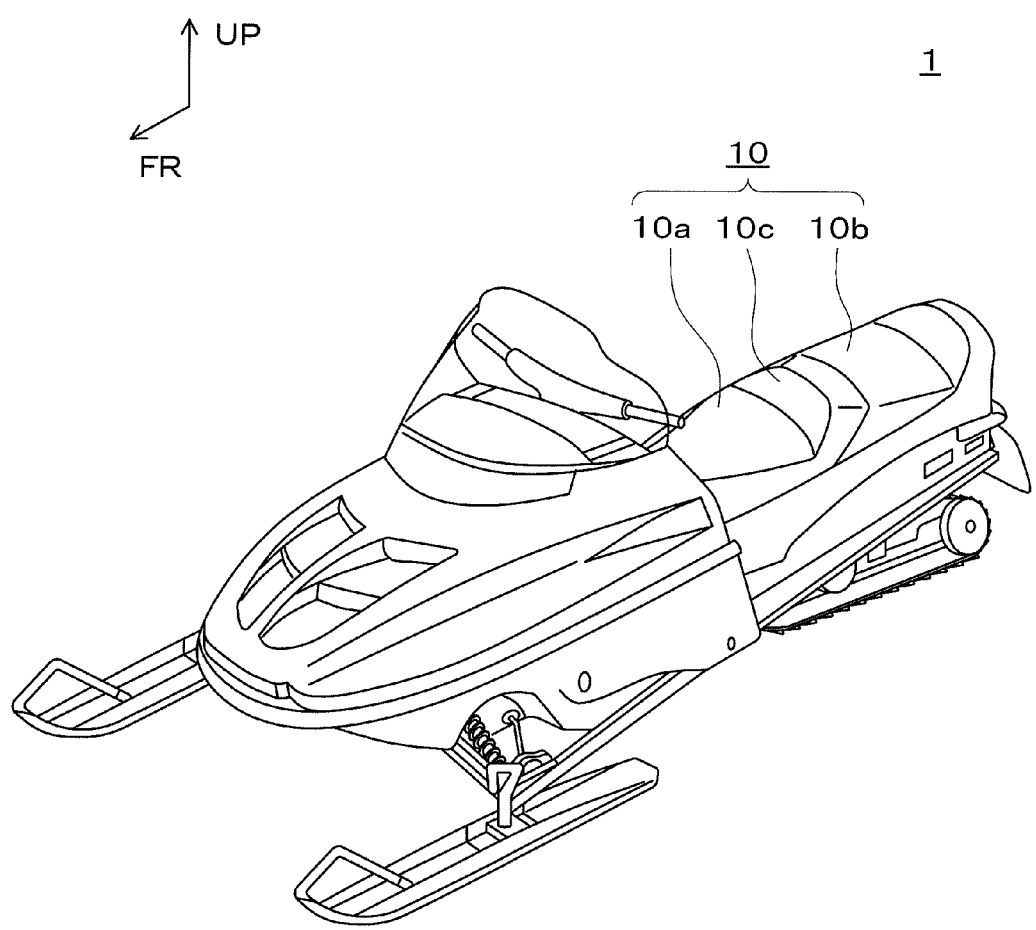
FIG. 1 is a perspective view of a vehicle having a seat according to an embodiment of the present invention.
Figure 2:
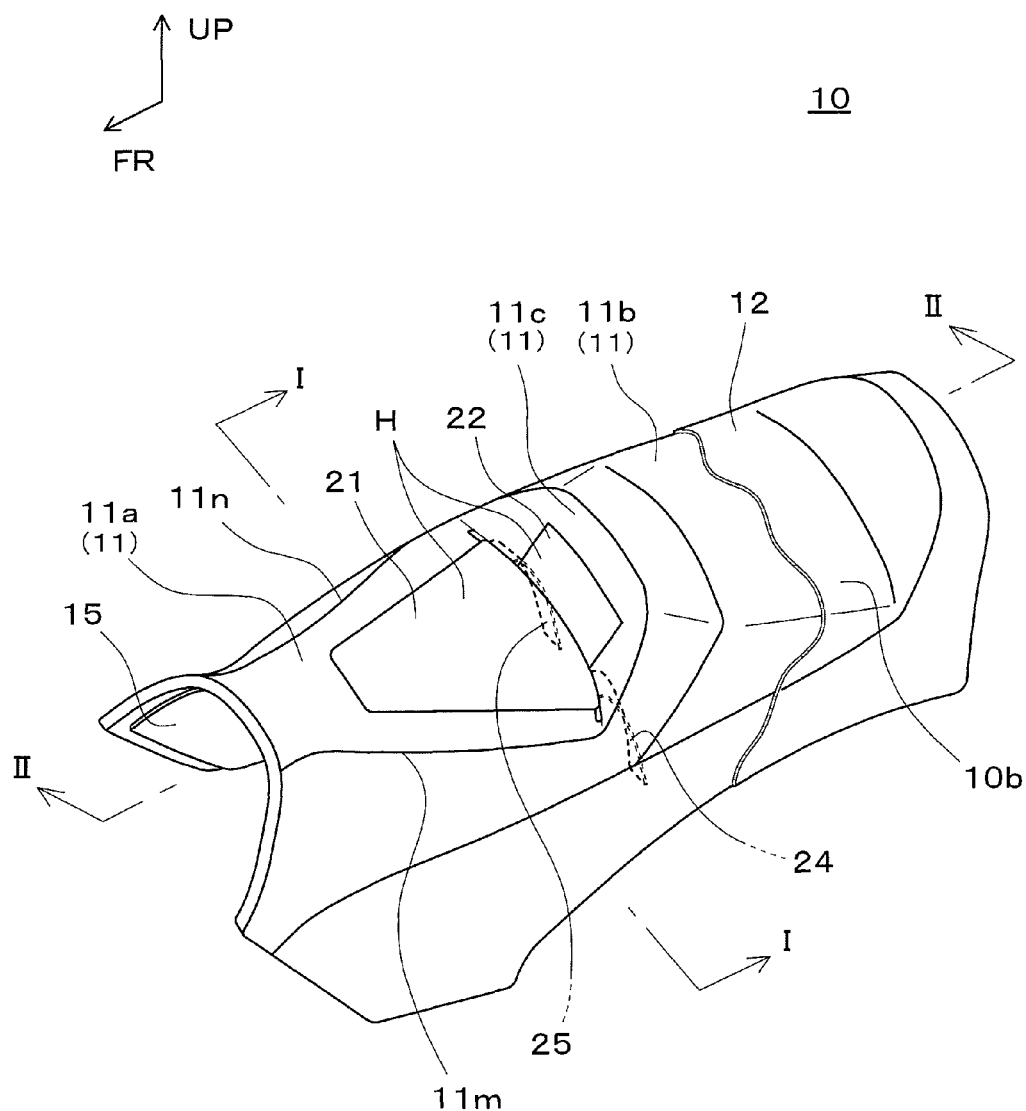
FIG. 2 is a perspective view of the seat with a seat heater disposed therein.
Figure 3:
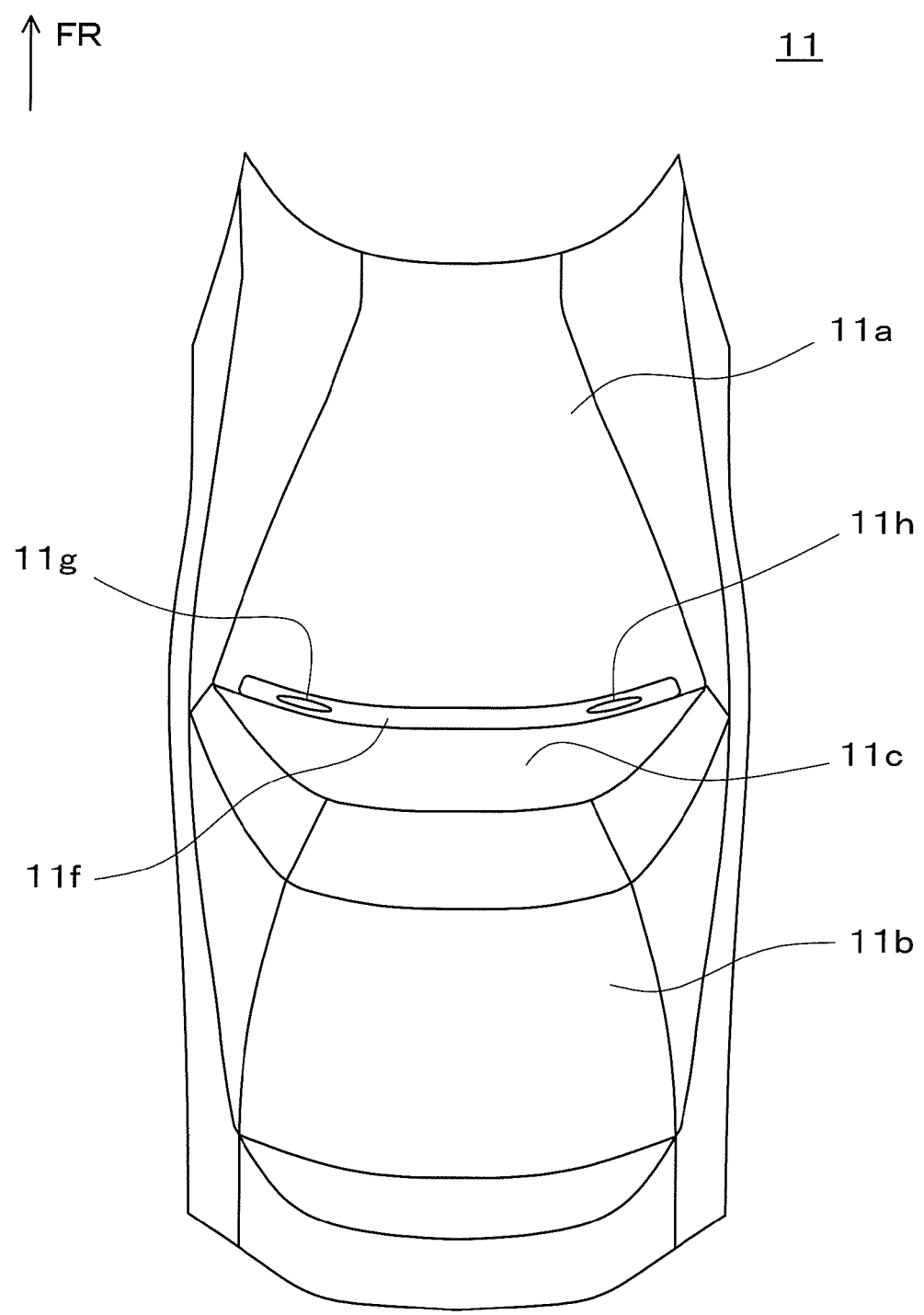
FIG. 3 is a plan view of a cushion member.
Figure 4:
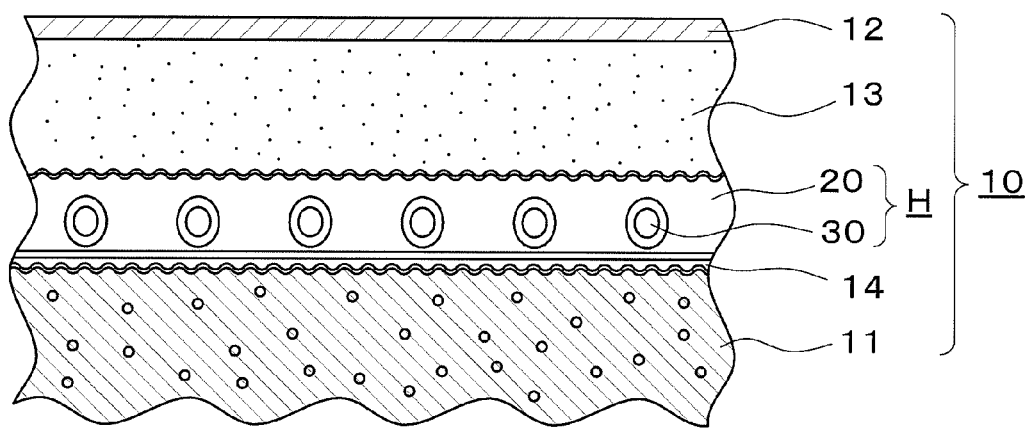
FIG. 4 is an enlarged sectional view of a principal portion taken on line I-I in FIG. 2.
Figure 5:
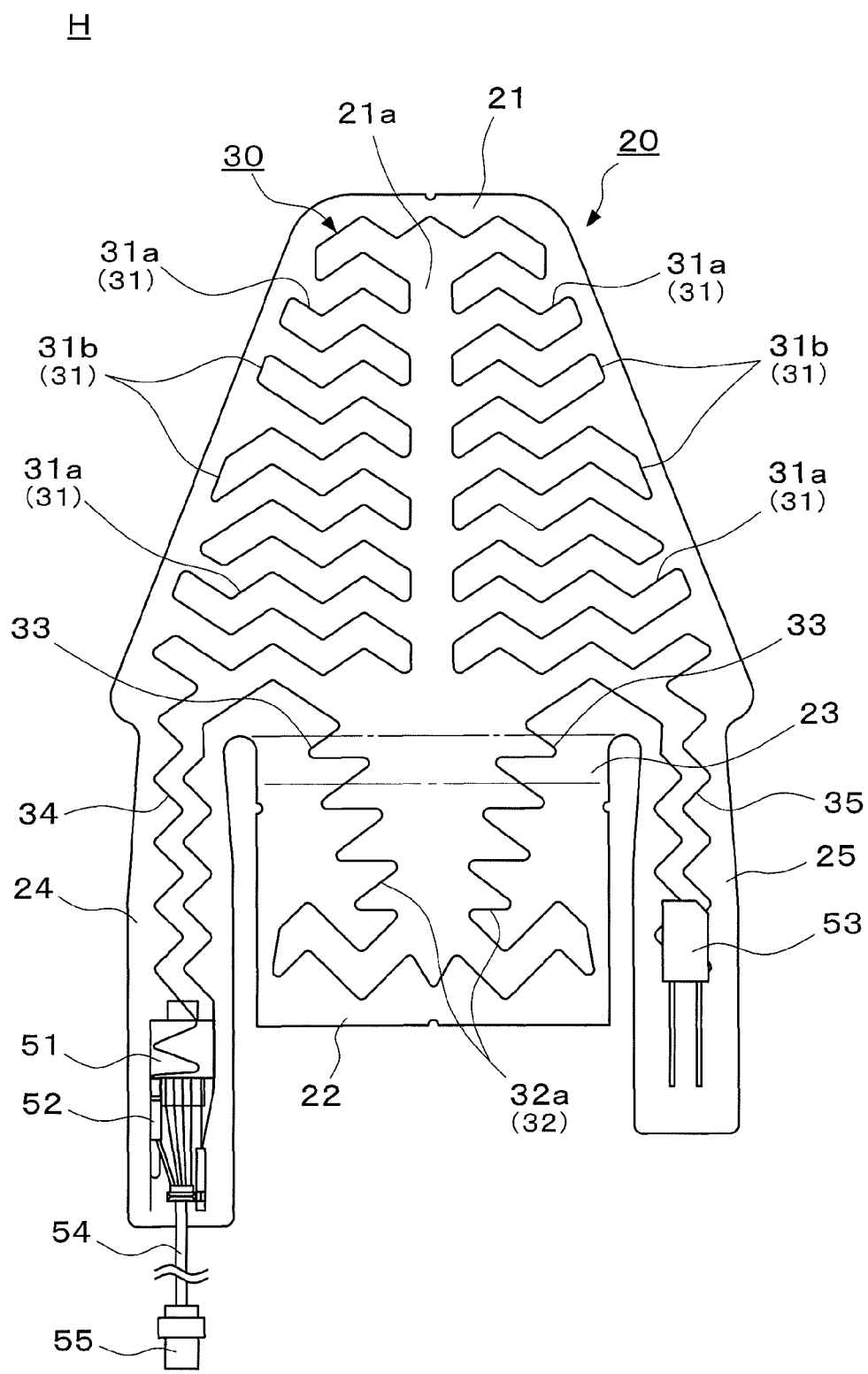
FIG. 5 is a plan view of the seat heater.
Figure 6:
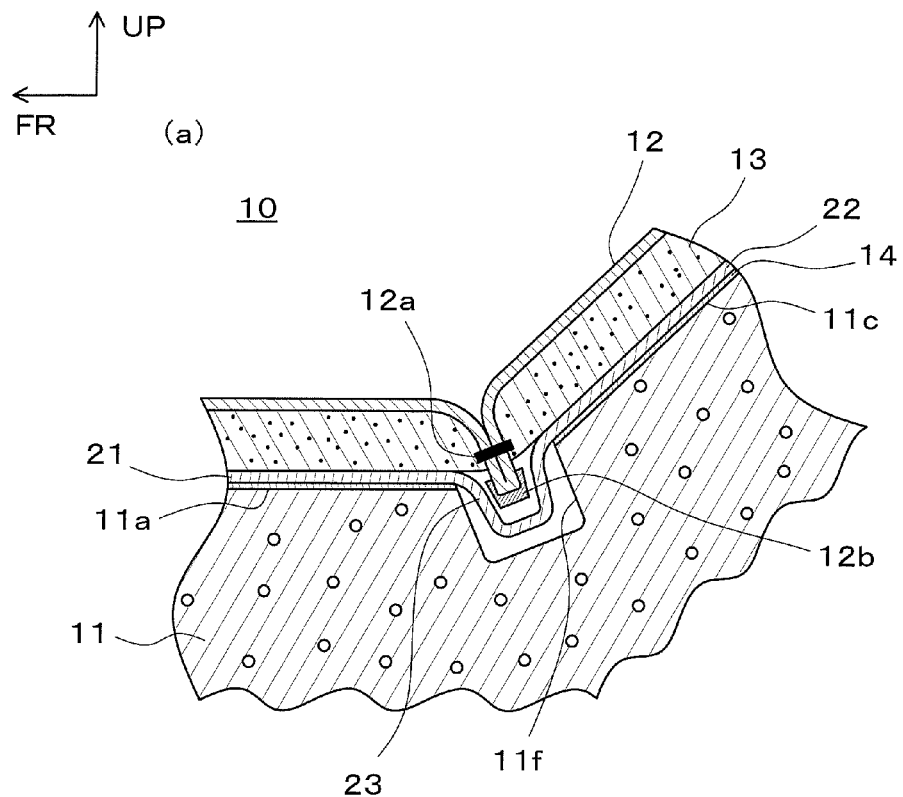
FIG. 6 is an enlarged sectional view of a principal portion taken on line II-II in FIG. 2.
Figure 6:
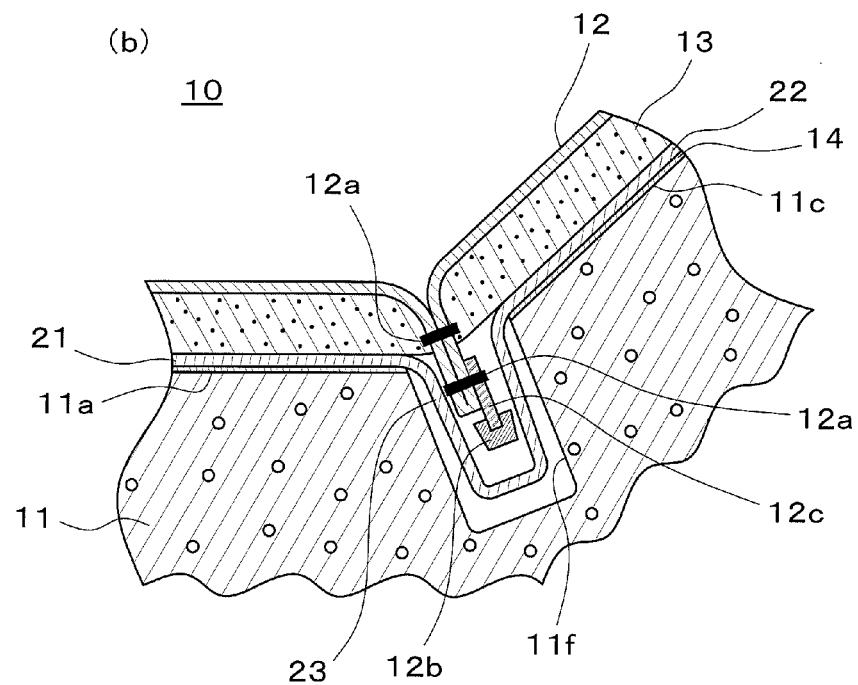
Figure 7:
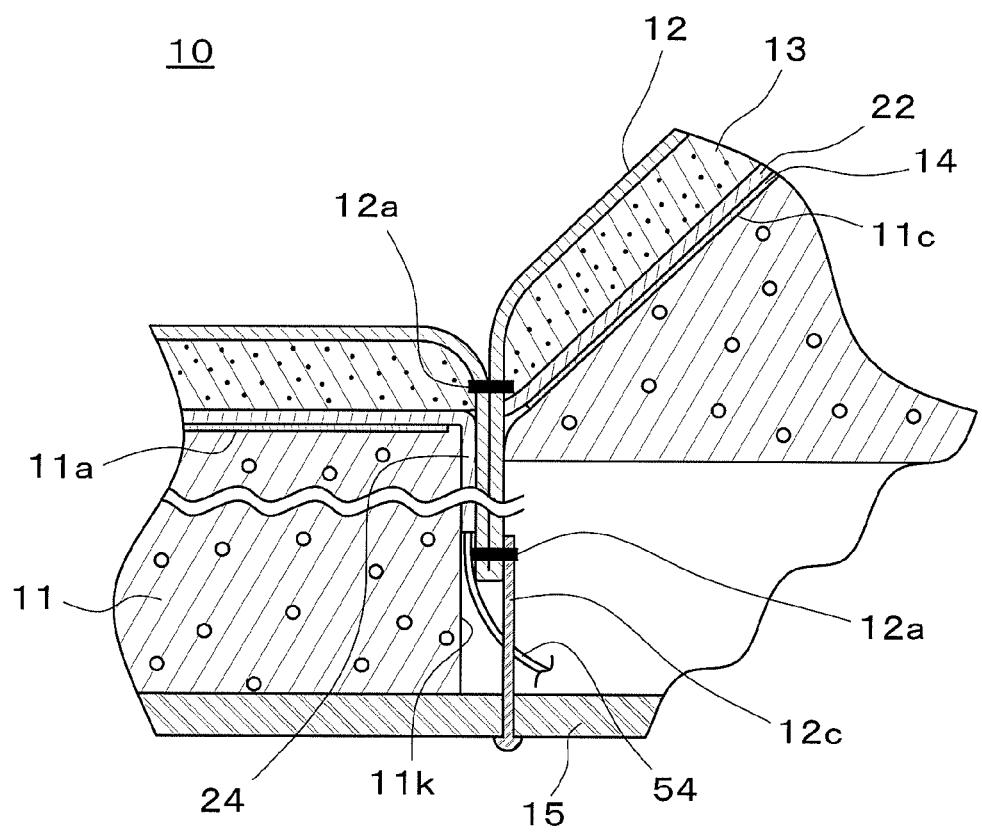
FIG. 7 is a diagram explanatory of an installed state of a skin material, the cushion member, and a bottom plate.
Figure 8:
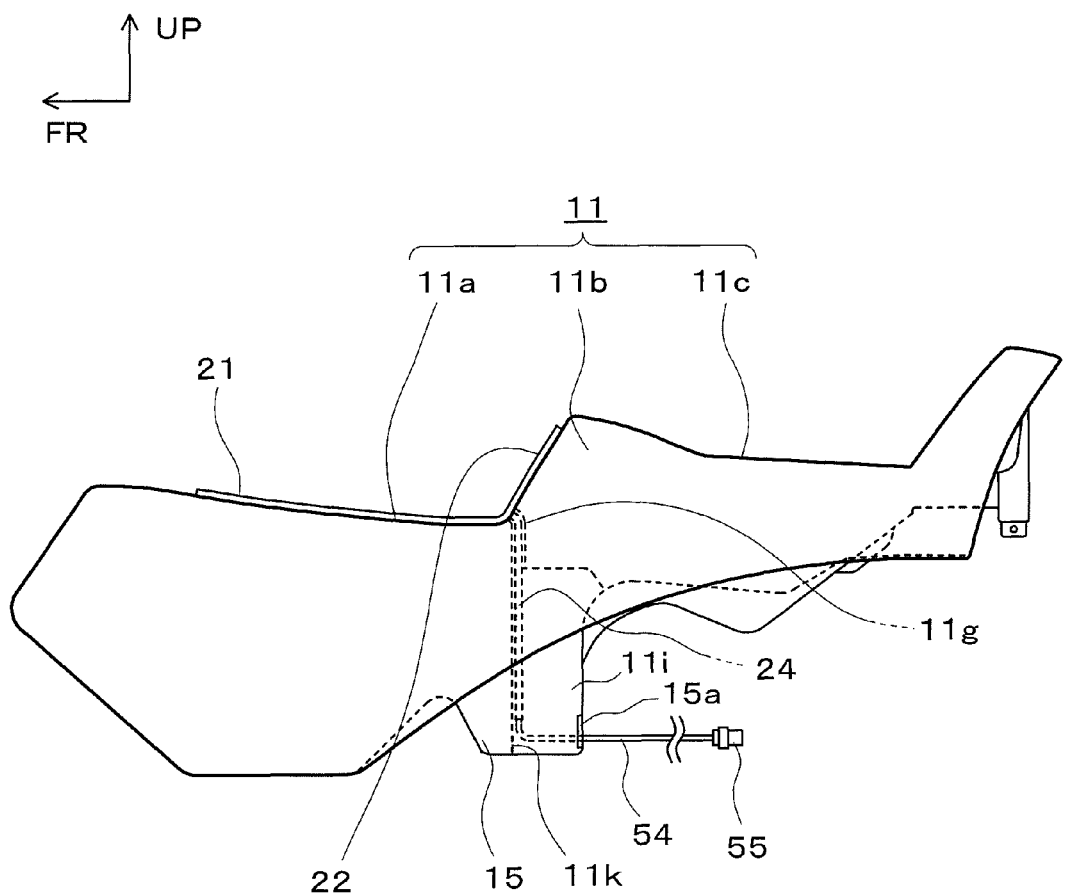
FIG. 8 is a side view showing a state in which the cushion member and the seat heater were placed on the bottom plate.
Figure 9:
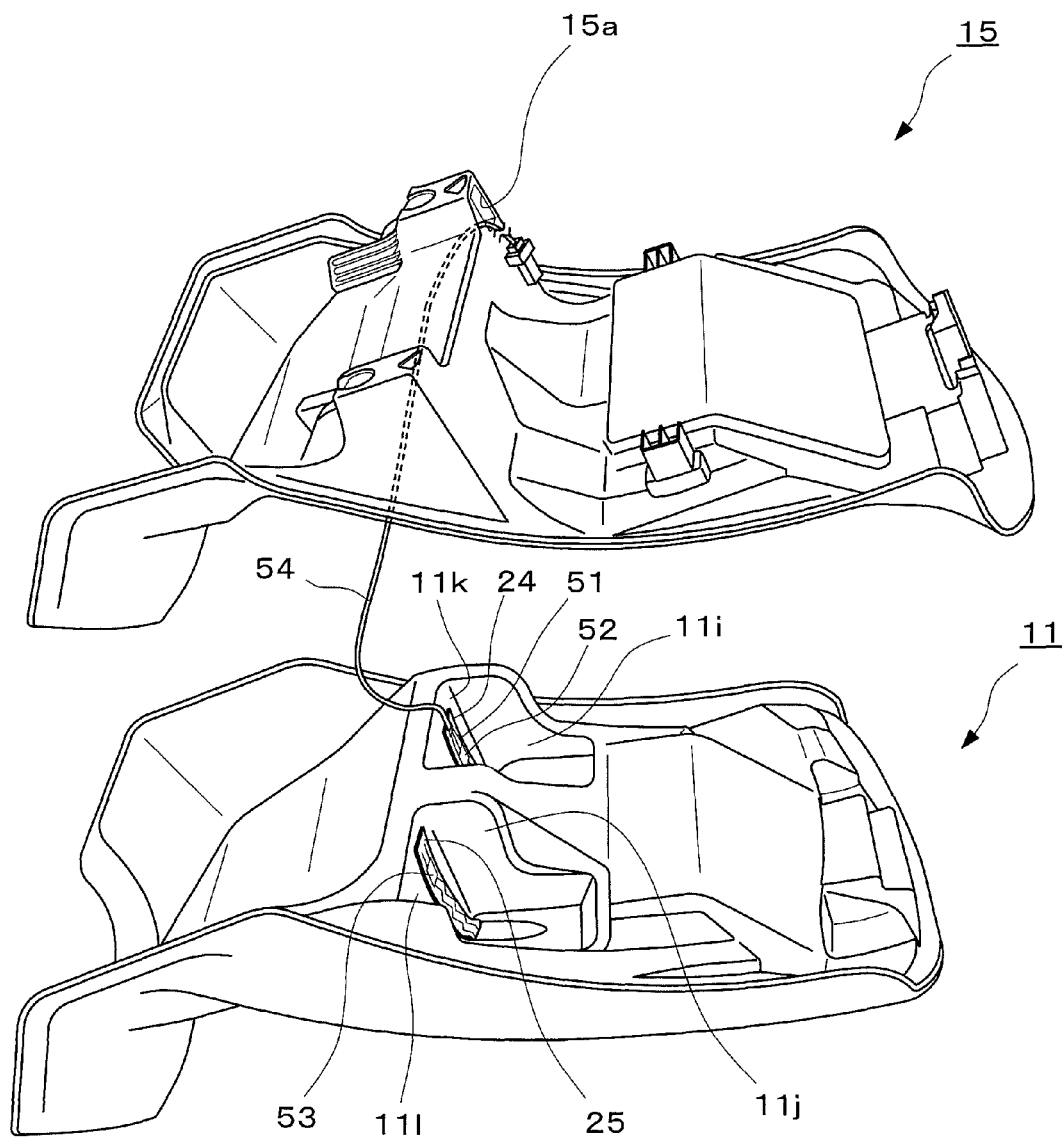
FIG. 9 is a perspective view of the cushion member and the bottom plate.
Figure 10:
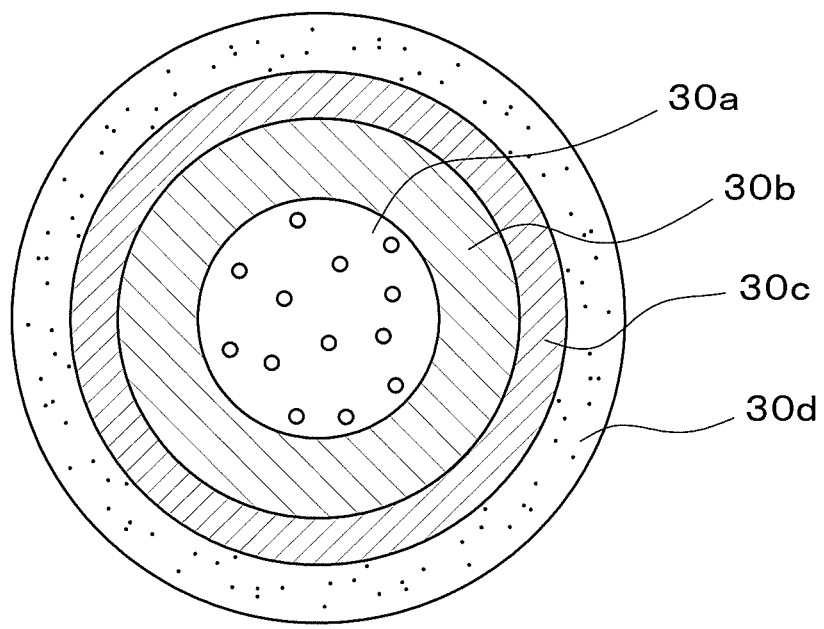
FIG. 10 is a sectional view of a heater wire.
Figure 11:
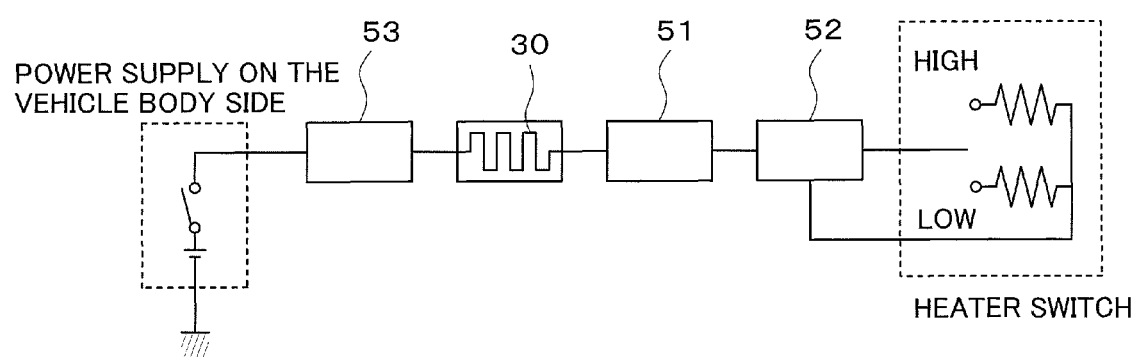
FIG. 11 is a block diagram related to wiring of the seat heater.

FIGS. 1 to 11 illustrate an embodiment of the present invention, of which FIG. 1 is a perspective view of a vehicle having a seat, FIG. 2 is a perspective view of the seat with a seat heater disposed therein, FIG. 3 is plan view of a cushion member, FIG. 4 is an enlarged sectional view taken on line I-I in FIG. 2, FIG. 5 is a plan view of the seat heater, FIG. 6 is an enlarged sectional view of a principal portion taken on line II-II in FIG. 2, FIG. 7 is a view explanatory of an installed state of a skin material, the cushion member, and a bottom plate, FIG. 8 is a side view showing a state in which the cushion member and the seat heater were placed on the bottom plate, FIG. 9 is a perspective view of the cushion member and the bottom plate, FIG. 10 is a sectional view of a heater wire, and FIG. 11 is a block diagram related to wiring of the seat heater. In the drawings, FR indicates a front side of a vehicle body and UP indicates an upper side of the vehicle body. Further, the transverse direction in the following description means the right and left direction in a state in which a sitting person on the seat faces the front side of the vehicle body.

The seat of this embodiment is a sitting seat and is preferably applicable, for example, to seats mounted on massage chairs, sofas, and vehicles. Examples of vehicles are four-wheel vehicles, two-wheel vehicles (motorcycles), three-wheel vehicles, snowmobiles, and waterbikes. Above all, the seat of this embodiment is preferably applicable, for example, to straddling type vehicles such as two-wheel vehicles (motorcycles), three-wheel vehicles, snowmobiles and waterbikes.

[Configuration of Vehicle Seat Heater H]

As shown in FIG. 1, a seat 10 provided in a vehicle 1 associated with this embodiment is a tandem seat having a front seat 10*a* and a rear seat 10*b*, and a backrest 10*c* for bearing the waist of a person sitting on the front seat 10*a* is formed between the front seat 10*a* and the rear seat 10*b*. As shown in the same figure, a sitting surface of the rear seat 10*b* is one step higher than that of the front seat 10*a*.

As shown in FIG. 2, the seat 10 includes a cushion member 11, a skin material 12 which covers the cushion member 11, a vehicle seat heater H disposed between the cushion member 11 and the skin material 12, and a bottom plate 15 as a support member formed with smooth concaves and convexes, with the cushion member 11 placed thereon. The seat 10 is formed in a predetermined shape by the cushion member 11 and the skin material 12. In FIG. 2 there is shown a state in which a portion of the skin material 12 located ahead of the rear seat 10*b* has been cut off.

The cushion member 11 is formed of stretchable polyurethane foam and the like, and is fixed in a state where it is placed on an upper surface of the bottom plate 15 formed of a synthetic resin for example. As shown in FIGS. 2 and 3, the cushion member 11 includes a front seat cushion surface portion 11*a* which constitutes the front seat 10*a*, a rear seat cushion surface portion 11*b* which constitutes the rear seat 10*b*, and a backrest surface portion 11*c* which constitutes the backrest 10*c*. The front seat cushion surface portion 11*a* is formed so that its width between both side edges in the transverse direction of the vehicle body becomes narrower from the rear side toward the front side of the vehicle body, mainly bearing the hip of a sitting person from below. The backrest surface portion 11*c* is extended upwards and rearwards of the vehicle body from vehicle body rear side edge portions of the front seat cushion surface portion 11*a*, mainly bearing the waist of the sitting person from behind. The front seat cushion surface portion 11*a* corresponds to the seat cushion surface portion of the seat 10.

A vehicle heater H to be described later is disposed in the front seat cushion surface portion 11a and the backrest surface portion 11c. The portion of the front seat cushion surface portion on which the vehicle seat heater H is placed is a predetermined distance inwards from each of both left and right edges 11m, 11n and further from a front edge of the front seat cushion surface portion 11a.

As shown in FIG. 3, a pulling-over slot 11f of a generally concave section is formed between the front seat cushion surface portion 11a and the backrest surface portion 11c of the cushion member 11 and in the transverse direction of the vehicle body, as a space for pulling over the skin material 12 which covers the cushion member 11 toward the bottom plate 15. Further, elongated holes 11g and 11h for insertion therein of lead-in portions when pulling over the skin material 12 toward the bottom plate 15 are formed in positions spaced a predetermined distance inwards from both right and left ends of the pulling-over slot 11f, the holes 11g and 11f being formed as through holes from above to below, that is, from the front seat cushion surface portion 11a side toward the bottom plate 15. The pulling-over slot 11f as a space for pulling over the skin material 12 also functions as a space for inserting therein a part of the vehicle seat heater H to be described later. Insertion portions 24 and 25 (FIG. 2) of a base member 20 to be described later are inserted through the holes 11g and 11h respectively.

The skin material 12 is, for example, woolly nylon or vinyl leather having stretchability and is formed in a predetermined shape beforehand so that it can cover the cushion member 11 from above. End portions of the skin material 12 are fixed to back-side edges of the bottom plate 15 by means of a tacker or the like. The configuration for pulling over the skin material 12 will be described later.

FIG. 4 shows a section of an area where the vehicle seat heater H in the front seat 10a is disposed. An area of the backrest 10c where the vehicle seat heater H is disposed is also of the same configuration. In this embodiment, a base member 20 of the vehicle seat heater H is put and fixed onto the cushion member 11 through an adhesive sheet 14 such as a double-coated adhesive tape, and high density foam 13 is put thereon being covered with the skin material 12. If soft or semi-soft slab urethane is used as the foam 13, then because of such a characteristic of slab urethane as being stretchable in various directions, not only is it possible to obtain a good feeling when a person sits thereon, but also it is possible to obtain riding comfortableness since vibration transmitted to the foam from the vehicle body is absorbed effectively, thus affording an extremely comfortable feeling.

The method for fixing the base member 20 of the vehicle seat heater H to the cushion member 11 is not limited to the use of the adhesive sheet 14. For example, the fixing may be done using an adhesive material or by sewing. Moreover, without interposition of the foam 13 between the cushion member 11 and the skin material 12 as in this embodiment, a configuration wherein the cushion member 11 and the vehicle seat heater H are directly covered with the skin material 12 may be employed.

As shown in FIG. 5, the vehicle seat heater H according to this embodiment includes the planar base member 20, a heater wire 30 fixed to the base member 20, a thermistor 51, a controller 52, a breaker 53, an electric wire 54, and a connector 55. The heater wire 30 may be fixed to the base member 20 by bonding for example, or it may be woven into the base member 20 as in FIG. 4.

The base member 20 includes a seat cushion surface side portion 21, a backrest surface side portion 22, a connection surface portion 23 formed between the seat cushion surface side portion 21 and the backrest surface side portion 22, and a pair of insertion portions 24 and 25. These portions are formed integrally, namely, one continuous piece using integral cloth or the like. The base member 20 is formed of a material which is stretchable in various directions, for example, non-woven cloth such as polyester (e.g., polyethylene terephthalate) or foam such as polyurethane foam.

Although the base member 20 shown in this embodiment includes the seat cushion surface side portion 21, the backrest surface side portion 22, the connection surface portion 23 formed between the seat cushion surface side portion 21 and the backrest surface side portion 22, and a pair of insertion portions 24 and 25, the base member 20 may be configured so as not to include the backrest surface side portion 22 and the connection surface portion 23. However, it is preferable for the base portion 20 to include the connection surface portion 23 formed between the seat cushion surface side portion 21 and the backrest surface side portion 22 because a heater area can be ensured also in the backrest surface portion 11c.

Insertion portion heater wires 34 and 35 are extended from seat cushion surface side heater wires 31 disposed in the seat cushion surface side portion 21, and the temperature control (thermistor 51, controller 52, breaker 53) that controls the temperature of the heater wire 30 (seat cushion surface side heater wires 31, backrest surface side heater wires 32, connection heater wires 33 and insertion portion heater wires 34, 35) is connected electrically to the insertion portion heat wires 34 and 35.

The seat cushion surface side portion 21 is a portion disposed on the front seat cushion surface portion 11a of the cushion member 11 and is formed in a generally trapezoidal shape so that the width between both side edges in the transverse direction of the vehicle body becomes narrower from the rear side to the front side of the vehicle body in conformity with the shape of the front seat cushion surface portion 11a. Further, the seat cushion surface side portion 21 is formed in a shape and size such that both its side edges in the transverse direction of the vehicle body are positioned inside at a predetermined distance from both left and right edges 11m, 11n (see FIG. 2) of the front seat cushion surface portion 11a. The predetermined distance from both left and right edges 11m, 11n is a distance that avoids an area on which a maximum load is imposed from the sitting person. Because of the predetermined distance from the edges 11m and 11n, the durability of the vehicle seat heater H is improved.

The backrest surface side portion 22 is formed in a generally rectangular shape and is extended backward of the vehicle body from a vehicle body rear-side end portion of the seat cushion surface side portion 21 (an end portion on the wider side of the trapezoidal shape) at a position exclusive of both right and left end portions. The backrest surface side portion 22 is a portion disposed on the backrest surface portion 11c of the cushion member 11, and it may have a shape other than the rectangular shape insofar as it is formed in shape and size capable of being disposed on the backrest surface portion 11c.

The connection surface portion 23 is a connection formed continuously and integrally between the seat cushion surface side portion 21 and the backrest surface side portion 22. The connection surface portion 23 is provided as a play (slack portion) to prevent a tensed state of the base member 20 when disposed on the cushion member 11. More specifically, as shown in FIGS. 6(a) and 6(b), the connection surface portion 23 is inserted in a bent state into the pulling-over slot 11f of the cushion member 11, the seat cushion surface side portion 21 is disposed on the front seat cushion surface portion 11a, and the backrest surface side portion 22 is disposed on the backrest surface portion 11c. The play portion of the connection surface portion 23 disposed in a bent state into the pulling-over slot 11f corresponds to a transfer suppresser. FIGS. 6(a) and 6(b) are sectional views showing a state in which the skin material 12 is pulled over after placing and fixing the vehicle seat heater H onto the cushion member 11 to place the foam 13 thereon and cover the foam 13 with the skin material 12. The pulling over method shown in FIGS. 6(a) and 6(b) is an example and constitutes no limitation. There may be used any other suitable known technique.

By thus disposing the base member 20 while providing a play (slack portion) between the seat cushion surface side portion 21 and the backrest surface side portion 22, there is no fear that the base member 20 may be disposed in a tensed state on the cushion member 11 under mutual tension of the seat cushion surface side potion 21 and the backrest surface side portion 22. Therefore, even if a pulling force is developed in the seat cushion surface side portion 21 by load shifting of the sitting person on the front seat cushion surface portion 11a, it is possible to suppress the transfer of that pulling force to the backrest surface side portion 22, and hence it is possible to prevent deformation of the vehicle seat heater H. Thus, durability is improved while the seat cushion surface side portion 21 and the backrest surface side portion 22 of the vehicle seat heater H are formed integrally.

Besides, since the vehicle seat heater H comprises an integral and continuous combination of the vehicle seat heater disposed on the front seat 10a side of the seat 10 and the vehicle seat heater disposed on the backrest 10c side of the seat 10, it is enough to mount one vehicle seat heater H to the cushion member 11 in order to warm both the front seat 10a side and the backrest 10c side of the seat 10. Thus, the number of parts can be reduced. Further, it is possible to simplify the work for mounting the vehicle seat heater H to the cushion member 11.

Moreover, since the vehicle seat heater disposed on the front seat 10a side and the vehicle seat heater disposed on the backrest 10c side of the seat 10 are formed integrally and continuously, it is possible to dispose the vehicle seat heater H without forming any gap between the front seat 10a side and the backrest 10c side. Consequently, it is possible to surely warm the sitting person on the seat 10 from his or her hip to waist, which are in contact with the seat, thus making it possible to provide a sufficient comfortable feeling to the sitting person.

Further, the vehicle seat heater H is inserted, in a bent state of the connection surface portion 23 of the base member 20, into the pulling-over slot 11f formed between the front seat cushion surface portion 11a and the backrest surface portion 11c of the cushion member 11. That is, in the vehicle seat heater H, a play (slack portion) is formed between the seat cushion surface side portion 21 and the backrest surface side portion 22 by the bent connection surface portion 23, so that it is possible to prevent the vehicle seat heater H from being fixed in a tensed state to the cushion member 11. Accordingly, even if a pulling force is developed in the seat cushion surface side potion 21 as a result of loading shift of the sitting person on the front seat cushion surface portion 11a, it is possible to suppress the transfer of the pulling force to the backrest surface side portion 22, and hence it is possible to prevent deformation of the vehicle seat heater H. Thus, the durability of the vehicle seat heater H can be improved while forming the seat cushion surface side portion 21 and the backrest surface side portion 22 of the vehicle seat heater H integrally. Besides, the bent (deflected) portion of the connection surface portion 23 is received within the pulling-over slot 11f and is not influenced by contact thereof with the sitting person. This is more preferable in terms of durability.

In the vehicle seat heater H, the seat cushion surface side portion 21 of the base member 20 is formed in a trapezoidal shape. More particularly, the seat cushion surface-side portion 21 is formed in a trapezoidal shape such that the width between both side edges in the transverse direction of the vehicle body becomes larger from the front side toward the rear side of the vehicle body. Therefore, by diminishing the warming area on the vehicle body front side of the front seat cushion surface portion 11a and ensuring a sufficient warming area on the vehicle body rear side, namely, in the area where the hip of the sitting person is positioned, not only the comfortableness of the sitting person is improved, but also it is possible to warm the front seat cushion surface portion 11a efficiently.

Further, the seat cushion surface side portion 21 of the base member 20 is disposed a predetermined distance inwards from both side edges 11m and 11n in the vehicle body transverse direction of the front seat cushion surface portion 11a. It is preferable to set this predetermined distance such that the distance avoids the area of the front seat cushion surface portion 11a on which a maximum load from the sitting person is imposed. Particularly, in such a straddling type seat 10 as in this embodiment, if the vehicle seat heater H is disposed while avoiding the maximum loaded area from the sitting person at both side ends of the front seat cushion surface portion 11a, the vehicle seat heater H is less likely influenced by a load shift of the sitting person, for example, and hence the durability of the vehicle seat heater H is improved.

As shown in FIG. 5, the heater wire 30 includes the seat cushion surface side heater wires 31 fixed to the seat cushion surface side portion 21, the backrest surface side heater wires 32 fixed to the backrest surface side portion 22, the connection heater wires 33 fixed to the connection surface portion 23, and the insertion portion heater wires 34 and 35 fixed to the insertion portions 24 and 25, respectively. These heater wires are laid on the base member 20 in accordance with a predetermined wiring pattern.

The seat cushion surface side heater wires 31 include a plurality of first extending portions 31a extended in the transverse direction of the vehicle body and a plurality of side portions 31b disposed so as to connect the first extending portions 31a near right and left side edges of the seat cushion surface side portion 21. The seat cushion surface side heater wires 31 are fixed adhesively onto the seat cushion surface side portion 21 which constitutes the base member 20.

The first extending portions 31a are wired so as to be substantially right-left symmetric on both right and left sides of a central part 21a positioned centrally in the vehicle body transverse direction of the seat cushion surface side portion 21 and are mutually spaced a predetermined distance in the longitudinal direction of the vehicle body. Further, the first extending portions 31a are each formed so that the width thereof in the transverse direction of the vehicle body becomes larger from the front side toward the rear side of the vehicle body in conformity with the shape of the seat cushion surface side portion 21 formed in a trapezoidal shape.

The first extending portions 31a are each formed in a wavy shape so that mountain and valley portions are continuous. Consequently, when a stretching force acting in the transverse direction of the vehicle body is exerted on the seat cushion surface side portion 21, the extending portions 31a can also stretch together with the seat cushion surface side portion 21. The mountain and valley portions are formed so as to become larger in number from the front side toward the rear side of the vehicle body correspondingly to the width length in the vehicle body transverse direction of the first extending portions 31a.

The side portions 31b are for connecting end portions of the first extending portions 31a adjacent to each other in the longitudinal direction of the vehicle body near right and left side edges of the seat cushion surface side portion 21. Of the plural side portions 31b, those disposed at positions exclusive of the front edge side and rear side of the seat cushion surface side portion 21 are positioned along and in substantially parallel with the right and left side edges of the seat cushion surface side portion 21. Thus, since the seat cushion surface side heater wires 31 are partially disposed along the side edges of the seat cushion surface side portion 21, it is possible to ensure a heater area conforming to the shape of the base member 20 and hence possible to warm the hip of the sitting person efficiently.

The backrest surface side heater wires 32 include a pair of second extending portions 32a and are fixed adhesively onto the backrest surface side portion 22 of the base member 20. The pair of second extending portions 32a are wired obliquely so that the distance of spacing between the two in the transverse direction of the vehicle body becomes narrower from the front side toward the rear side of the vehicle body, and they are formed in a wavy shape so that respective mountain and valley portions are continuous. In this embodiment, since the pair of second extending portions 32a are thus wired, when a stretching force acting in the longitudinal and transverse directions of the vehicle body is exerted on the backrest surface side portion 22 from the waist of the sitting person, the second extending portions 32a can also stretch together with the backrest surface side portion 22.

The connection heater wires 33 are fixed adhesively onto the connection surface portion 23 of the base member 20 and connect the seat cushion surface side heater wires 31 and the backrest surface side heater wires 32 electrically to each other.

The insertion portion heater wire 34 is fixed adhesively onto the insertion portion 24 of the base member 20 and includes two wires extended from the seat cushion surface side heater wire 31 and the backrest surface side heater wire 32, respectively. The insertion portion heater wire 34 connects those two wires with the thermistor 51 and the controller 52, respectively, which are fixed to the insertion portion 24. The two wires which constitute the insertion portion heater wire 34 are laid meanderingly and substantially in parallel to each other in the longitudinal direction of the vehicle body.

The insertion portion heater wire 35 is fixed adhesively onto the insertion portion 25 of the base member 20 and includes two wires extended from the seat cushion surface side heater wire 31 and the backrest surface side heater wire 32, respectively. The insertion portion heater wire 35 connects those two wires with the breaker 53 fixed to the insertion portion 25. The two wires which constitute the insertion portion heater wire 35 are laid meanderingly and substantially in parallel to each other in the longitudinal direction of the vehicle body.

The heater wire 30 in the vehicle seat heater H comprises the seat cushion surface side heater wires 31 fixed to the seat cushion surface side portion 21, the backrest surface side heater wires 32 fixed to the backrest surface side portion 22, and the connection heater wires 33 for connecting the seat cushion surface side heater wires 31 and the backrest surface side heater wires 32 electrically to each other. The seat cushion surface side heater wires 31 and the backrest surface side heater wires 32 are connected electrically to each other by the connection heater wires 33. In this embodiment, the heater wire 30 is constituted by a single continuous heater wire. Therefore, it is possible to reduce the number of wiring connections involved in the installation of the vehicle seat heater H and hence possible to simplify the mounting work.

In this embodiment, on the seat cushion surface side portion 21 which constitutes the base member 20, the heater wires disposed meanderingly in the longitudinal direction of the vehicle body are two rows, but may be three or more rows.

Further, the areas warmed by one vehicle seat heater H are the front seat 10a and the backrest 10c here, but the rear seat 10b may be included.

[Configuration of Skin Material 12]

As shown in FIG. 6, the connection surface portion 23 in the vehicle seat heater H is inserted in a bent (deflected) state into the pulling-over slot 11f of the cushion member 11, and the seat cushion surface side portion 21 and the backrest surface side portion 22 are disposed on the front seat cushion surface portion 11a and the backrest surface portion 11c, respectively. FIG. 6(a) shows a state in which, after fixing the vehicle seat heater H onto the cushion member 11 and placing the foam thereon, the foam 13 is covered with the skin material 12 and the skin material 12 is pulled over. Numeral 12a denotes a seam portion, and numeral 12b denotes a pulling-over piece.

In FIG. 6(a), bent portions of the skin material 12 located at a position corresponding to the pulling-over slot 11f are joined by sewing. That is, the skin material 12 has the seam portion 12a at the position corresponding to the pulling-over slot 11f, and the bent portions thereof are sewed to each other in the seam portion 12a. A tip side of the skin material 12 is held grippingly by the pulling-over piece 12b, and the skin material 12 is mounted by pulling over the pulling-over piece 12b into the pulling-over slot 11f. The pulling-over piece 12b is formed along the pulling-over slot 11f and is positioned in a deflected portion of the connection surface portion 23 of the vehicle seat heater H.

Although FIG. 6(a) shows a configuration in which the pulling-over piece 12b is attached directly to the skin material 12, the configuration in FIG. 6(b) in which the skin material 12 is further provided with a pulling-over cord 12c may be employed. More specifically, a configuration in which the pulling-over cord 12c is sewed to the skin material 12 and is joined to the pulling-over piece 12b may be employed. According to this configuration, since the pulling-over cord 12c is disposed in the interior of the pulling-over slot 11f, a sitting person less likely feels the pulling-over cord 12c as a foreign matter when coming into abutment against the pulling-over cord 12c.

As will be described later, the pulling-over piece 12b and the pulling-over cord 12c both attached to the skin material are fixed through the holes 11g and 11h, thus affording a pulling-over configuration for the skin material 12. The mode for pulling over the skin material 12 is not limited to the above mode in this embodiment, but a known technique may be used accordingly.

As shown in FIGS. 6(a) and 6(b), the pulling-over slot 11f for pulling over the skin material 12 may be used as a space for receiving therein the connection surface portion 23 of the vehicle seat heater H. Thus, the bent (deflected) portion of the connection surface portion 23 can be accommodated without addition of any special configuration and members. Besides, since the pulling-over slot 11f is formed between the front seat cushion surface portion 11a and the backrest surface portion 11c and is concave inwards, namely, toward the bottom plate 15, from the surface of the cushion member 11, the bent (deflected) portion of the connection surface portion 23 is not influenced by contact thereof with the sitting person. Accordingly, the durability of the vehicle seat heater H is improved.

[Configuration for Mounting Vehicle Seat Heater H and Skin Material 12 to Cushion Member 11]

The insertion portions 24 and 25 of the vehicle seat heater H are extended like belts backward of the vehicle body from both left and right ends at vehicle body rear end portions (end portions on the wide side of the trapezoidal shape) of the seat cushion surface side portion 21 and are each formed at a predetermined width capable of being inserted from above into the holes 11g and 11h (see FIGS. 2 and 3) of the cushion member 11 when the base member 20 is disposed on the cushion member 11.

In the insertion portion 24, the thermistor 51 and the controller 52 are disposed both as temperature control means. The thermistor 51 is used as a sensor for detecting the temperature of the vehicle seat heater H, while the controller 52 is mounted for example to control the temperature of the vehicle seat heater H. The thermistor 51 and the controller 52 are mounted by a method such as sewing or bonding in a mutually connected state electrically. The heater wire 30 fixed to the seat cushion surface side portion 21 and the backrest surface side portion 22, as well as the electric wire 54 capable of being connected for example to a power supply (see FIG. 11) installed on the vehicle body side or to an ON-OFF switch (not shown) of the vehicle seat heater H, are connected to the thermistor 51 and the controller 52 respectively. The connector 55 capable of being engaged with and disengaged from an electric wire (not shown) extended from the vehicle body side is provided at a tip of the electric wire 54.

The breaker 53, which is an automatic return type for the prevention of overheating, is secured to the other insertion portion 25 by a method such as, for example, sewing or bonding. The heater wire 30 fixed to the seat cushion surface side portion 21 and the backrest surface side portion 22 are connected electrically to the breaker 53. Although the breaker 53 for preventing the flow of an excess current is provided in this embodiment, the breaker is not always necessary. It is disposed, if necessary, at the stage of design.

Preferably, the areas of the insertion portions 24 and 25 where the thermistor 51, controller 52 and breaker 53 are disposed are configured such that those devices are sandwiched in between two pieces of cloth joined using cloth (not shown) equivalent to the cloth of the base member 20. By configuring the insertion portions 24 and 25 such that the thermistor 51, controller 52 and breaker 53 are sandwiched in between the base member 20 with the heater wire 30 (insertion portion heater wires 34, 35) provided therein and another cloth, those devices can be protected.

The thermistor 51 is connected to the heater wire 30 to detect a change in electric resistance caused by a change in temperature of the heater wire 30 and to detect the temperature of the heater wire 30. The thermistor 51 is connected to the controller 52, which in turn controls the resistance value in interlock with the thermistor 51, thereby controlling the temperature of the heater wire 30. The controller 52 is also connected to a heater switch and is designed so as to be capable of switching the temperature of the heater wire 30 from high to low and vice versa.

The seat cushion surface side portion 21 of the vehicle seat heater H is disposed on the front seat cushion surface portion 11a. The insertion portion 24 with the insertion portion heater wire 34, thermistor 51 and controller 52 fixed thereto and the insertion portion 25 with the insertion portion heater wire 35 and breaker 53 fixed thereto are inserted through the holes 11g and 11h respectively formed in the cushion member 11.

The holes 11g and 11h are formed as through holes from the front seat cushion surface portion 11a side of the cushion member 11 to the bottom plate 15 side and the insertion portions 24 and 25 are inserted through the holes 11g and 11h respectively along the cushion member 11. The insertion portions 24 and 25 are covered with the skin material 12, which in turn is sewed to the pulling-over cord 12c at the seam portion 12a.

The pulling-over cord 12c is locked to the bottom plate 15 by a retaining portion of the bottom plate 15. The pulling-over cord 12c may be secured to the bottom plate 15 through a hole formed in the bottom plate 15 as in FIG. 7. Alternatively, a pulling-over string may be attached to the bottom plate 15 and the pulling-over cord 12c may be secured to the bottom plate 15 by engaging the pulling-over cord 12c with the pulling-over string.

Thus, by adopting the configuration wherein the insertion portions 24 and 25 are sandwiched in between the cushion member 11 and the skin material 12, the thermistor 51, controller 52 and breaker 53 provided in the insertion portions 24 and 25 can be protected against vibration, dust, and the like.

The insertion portions 24 and 25 are disposed in between the cushion member 11 and the bottom plate 15, more specifically, within recesses 11i and 11j respectively (see FIGS. 8 and 9). The recesses 11i and 11j include walls 11k and 11l respectively and are formed on the bottom plate 15 side of the cushion member 11. On the surface of the cushion member 11 on the side where the bottom plate 15 is disposed, the walls 11k and 11l are formed by cutting out surface at positions corresponding to the holes 11g and 11h.

FIG. 9 is a perspective view of the cushion member 11 and the bottom plate 15 as seen from the side on which a person does not sit, namely, from the back side, illustrating a state before putting the cushion member 11 on the bottom plate 15.

The electric wire 54 connected electrically to the insertion portion heater wire 34 disposed on the insertion portion 24 passes through a hole 15a formed in the bottom plate 15 and is extended to the back side of the bottom plate 15, i.e., the vehicle body side. In the seat 10 of the present invention, the cushion member 11, the vehicle seat heater H, and the skin material 12 are integrally disposed on the bottom plate 15, so that it facilitates installation on the vehicle body.

As described above, the insertion portions 24 and 25 are passed through the recesses 11i and 11j and are fixed adhesively to the walls 11k and 11l respectively. Since the thermistor 51, controller 52 and breaker 53 are disposed between the bottom plate 15 and the cushion member 11, these devices can be protected from external shocks and hence comfortableness is ensured.

Even when the cushion member 11 is placed on the bottom plate 15, the wall 11k is not in contact with the surface of the bottom plate 15 where the hole 15a is formed, with the recess 11i being present between the wall 11k and the bottom plate 15. Also as to the recess 11j, the wall 11l and the bottom plate 15 are not in contact to each other, providing a hollow space, when the cushion member 11 is placed on the bottom plate 15.

The recesses 11i and 11j are formed dividedly by a partition wall and are spaced apart from each other at left and right positions respectively of the vehicle body. The partition wall is offset to either the right or the left from the central position of the vehicle body. As a result, the recesses 11i and 11j are formed in different sizes. In FIG. 9, the thermistor 51 and the controller 52 are disposed within the recess 11i which is the larger in FIG. 9, while the breaker 53 is disposed within the smaller recess 11j. The thermistor 51, controller 52 and breaker 53 are disposed so as to be received within the recesses 11i and 11j of the cushion member 11. The above configuration permits an efficient use of the recesses 11*i* and 11*j*. According to the above configuration, the vehicle seat heater H is characterized in that its temperature control (thermistor 51, controller 52 and breaker 53) is disposed below the cushion member 11 (on the bottom plate side 15).

In the seat 10 of the present invention, the temperature control such as the thermistor 51, controller 52 and breaker 53 are not disposed on the sitting side of a person, i.e., on the front seat cushion surface portion 11*a*. That is, a load of the sitting person is not imposed on those temperature control and hence it is possible to prevent damage of the temperature control.

Moreover, since the insertion portions 24 and 25 are respectively disposed within the recesses 11*i* and 11*j* in a bonded state to the walls 11*k* and 11*l*, there is no fear of their abutment against the bottom plate 15. Thus, since the recess portions 11*i* and 11*j* are formed between the insertion portions and the bottom plate 15, vibration from the vehicle body side can be absorbed by the recess portions 11*i* and 11*j*, thus permitting a further decrease of vibration.

Further, since the insertion portions 24 and 25 pass through the holes 11*g* and 11*h*, then are conducted to the bottom plate 15 side from the front seat cushion surface portion 11*a* and are fixed to the walls 11*k* and 11*l* of the recesses 11*i* and 111*j*, there is no fear of the insertion portions 24 and 25 being twisted, so that a physical load is less likely imposed on the insertion portion heater wires 34 and 35 disposed in the insertion portions 24 and 25 and it is possible to prevent a local stretching.

[Method for Mounting Vehicle Seat Heater H]

Next, a description will be given below about a method for mounting the seat 10 having the vehicle seat heater H. First, the vehicle seat heater H is bent about the connection surface portion 23 of the base member 20, and the connection surface portion 23 is inserted in a bent (deflected) state into the pulling-over slot 11*f* of the cushion member 11 (see FIG. 6).

Thereafter, the insertion portions 24 and 25 in the base member 20 which constitutes the vehicle seat heater H are inserted into the holes 11*g* and 11*h* respectively. The insertion portions 24 and 25 are respectively inserted from the front seat cushion surface portion 11*a* of the cushion member 11 into the holes 11*g* and 11*h* formed through the cushion member 11 and are disposed on the back side of the cushion member 11. The insertion portion heater wire 34, thermistor 51 and controller 52 are fixed to the insertion portion 24, while the insertion portion heater wire 35 and breaker 53 are fixed to the insertion portion 25 (see FIGS. 3 and 5).

More specifically, the insertion portions 24 and 25 are inserted through the holes 11*g* and 11*h* formed in the cushion member 11 into the recesses 11*i* and 11*j* formed as hollow spaces between the cushion member 11 and the bottom plate 15. The recesses 11*i* and 11*j* are respectively provided with walls 11*k* ad 11*l*, the walls 11*k* and 11*l* being formed by cutting out a part of the cushion member 11 located on the bottom plate 15 side and at positions corresponding to the holes 11*g* and 11*h*.

As described above, after insertion of the insertion portions 24 and 25 into the recesses 11*i* and 11*j*, the insertion portions 24 and 25 are fixed adhesively to the walls 11*k* and 11*l* respectively, using bonding such as, for example, the adhesive sheet 14 or a double-coated adhesive tape.

Next, the seat cushion surface side portion 21 and the backrest surface side portion 22 of the base member 20 are attached to the front seat cushion surface portion 11*a* and the backrest surface portion 11*c* respectively of the cushion member 11 through use of the adhesive sheet 14. In this case, it is not always necessary to use the adhesive sheet 14. The vehicle seat heater H may be installed using a suitable adhesive or the like. Now, the mounting of the vehicle seat heater H to the cushion member 11 is over.

Further, the cushion member 11 is placed on the bottom plate 15 and is fixed thereto using an adhesive or the like. At this time, the insertion portion 24 with the thermistor 51 and the controller 52 fixed thereto and the insertion portion 25 with the breaker 53 fixed thereto are disposed within the recesses 11*i* and 11*j* respectively formed between the cushion member 11 and the bottom plate 15. The electric wire 54 and the connector 55 both extended from a tip of the insertion portion 24 are inserted through a hole (not shown) of the bottom plate 15 to the back side of the bottom plate 15 and are fixed at a predetermined position on the back side of the bottom plate 15.

Thereafter, the foam 13 is put on the vehicle seat heater H, and the bottom plate 15, cushion member 11, vehicle seat heater H and foam 13 are covered from above with the skin material 12. At this time, the skin material 12 is pulled over to the bottom plate 15 side through the holes 11*g* and 11*h* of the cushion member 11 and is fixed using a fixing member (not shown). Then, an end portion of the skin material 12 is fixed to a back-side edge of the bottom plate 15 by means of a tacker or the like. In this way, a seat 10 having the vehicle seat heater H is completed.

When mounting the seat 10 constructed as above to the vehicle 1, the electric wire 54 fixed to the back side of the bottom plate 15 and the electric wire extended from the vehicle body side are connected together through the connector 55, whereby the vehicle seat heater H is connected to the vehicle body side electrically. The mounting of the seat 10 to the vehicle 1 can be performed using a known technique. Now, the mounting of the seat 10 to the vehicle 1 is completed. The above method for mounting the vehicle seat heater H and method for mounting the seat 10 are one example, so these working processes may be altered where required.

The conventional seat heater has involved the problem that it undergoes a load of a sitting person directly and is therefore apt to be damaged, because the temperature control such as the controller are disposed on the sitting side of a person. However, by adopting the above arrangement of the temperature control means (thermistor 51, controller 52, and breaker 53) in connection with the configuration of the vehicle seat heater H, the degree of the temperature control undergoing a load of sitting person is reduced. In the vehicle seat heater H, at least the cushion member 11 and the skin material 12 are disposed between the temperature control and the sitting person's hip and waist. Therefore, the temperature control is less likely damaged, and it is possible to provide the seat 10 with a comfortable feeling when a person sits thereon.

By disposing the thermistor 51 and the controller 52 separately from the breaker 53, that is, by distributing them separately right and left, the weight balance between right and left is improved and it is possible to improve the operability of the vehicle 1.

As described above, with the seat 10 having the vehicle seat heater H according to this embodiment, the temperature control (thermistor 51, controller 52, breaker 53) is positioned below the front seat cushion surface portion 11*a* of the cushion member 11, more specifically, between the cushion member 11 and the bottom plate 15. Thus, unlike the prior art, the temperature control (thermistor 51, controller 52, breaker 53) is not disposed in the front seat cushion surface portion 11*a* of the cushion member 11 and therefore does not undergo a large load induced by a shift of the sitting person's weight.

Moreover, since the temperature control of the vehicle seat heater H is disposed in the hollow recesses 11*i* and 11*j* formed between the cushion member 11 and the bottom plate 15, it is protected more positively from external loads.

Further, by disposing the thermistor 51 and the controller 52, as well as the breaker 53, as the temperature control, separately in the transverse direction of the vehicle 1, it is possible to attain the saving of space, and it is possible to install the breaker 53 which has not been provided heretofore as part of the temperature control. As a result, even in the event of flowing of an excess current, it is possible to cut off the electric current, and hence it is possible to prevent overheating and to provide the vehicle seat heater H in which failure is suppressed.

Thus, since the thermistor 51, controller 52 and breaker 53 are disposed separately in the transverse direction of the vehicle 1, there is no fear of the center of gravity being offset in either the right or the left direction, so that it is easy to balance the vehicle 1 during travel and it is possible to improve the operability.

In the vehicle seat heater H, moreover, the holes 11*g* and 11*h* for insertion therein of the insertion portions 24 and 25, as well as the walls 11*k* and 11*l* for bonding thereto of the insertion portions 24 and 25, are provided in the cushion member 11. Therefore, when mounting the temperature control, twisting of the heater wire does not occur and hence it is possible to prevent the occurrence of inconveniences such as, for example, local stretching of the heater wire. Besides, since the holes 11*g* and 11*h* also serve as pulling-over holes for pulling over the skin material 12, it is not necessary to separately provide a process for forming the holes 11*g* and 11*h* and thus the manufacturing process is less complicated.

In the seat 10, the components are formed integrally in a state in which they are placed on the bottom plate 15. Further, the electric wire 54 is inserted through the hole 15*a* formed in the bottom plate 15, and the connector 55 is connected to the vehicle body side. With this configuration, the mounting of the seat 10 to the vehicle 1 becomes easier and it is possible to provide the seat 10 superior in workability.

Although according to the configuration of this embodiment the insertion portions 24 and 25 are inserted between the front seat 10*a* and the backrest 10*c*, the provision of the backrest 10*c* is not always needed. The seat 10 may have a planar seat cushion surface portion if it is formed, for example, with pulling-over holes (holes 11*i*, 11*j*) for pulling over the skin material 12.

Although the seat 10 according to this embodiment has the bottom plate 15, the bottom plate 15 is not always necessary. It depends on the design of the vehicle body side to which the seat 10 is mounted.

Although in this embodiment the thermistor 51 and the controller 52 are mounted to the insertion portion 24 provided on the vehicle body rear left side of the seat cushion surface side portion 21 and the breaker 53 is mounted to the insertion portion 25 provided on the vehicle body rear right side of the seat cushion surface side portion 21, the transverse arrangement is not limited thereto. For example, the breaker 53 may be mounted to the insertion portion 24 located on the rear left side of the vehicle body, while the thermistor 51 and the controller 52 may be mounted to the insertion portion 25 located on the rear right side of the vehicle body. Further, the thermistor 51, the controller 52 and the breaker 53 may be mounted to either the insertion portion 24 or the insertion portion 25. Although in this embodiment there is used the breaker 53 for preventing the flow of an excess current, there also may be adopted a configuration not provided with the breaker 53. Thus, a change of configuration may be made where required.

[Configuration of Heater Wire 30]

The heater wire 30 which constitutes the vehicle seat heater H will now be described with reference to FIG. 10. As shown in FIG. 10, the heater wire 30 includes a core 30*a*, a heating element layer 30*b*, an insulator layer 30*c*, and a heat-fusion layer 30*d*.

The core 30*a* is formed by bundling fibers having extremely large tensile force and heat resistance, e.g., aromatic polyamide fibers. The heating element layer 30*b* is provided so as to cover an outer periphery of the core 30*a*, and it is constituted by bundling plural heating element strands formed of, for example, tin-plated hard tin-copper alloy wires (SNCC). The insulator layer 30*c* is formed of a fluorine resin such as, for example, a tetrafluoroethylene-hexafluoropropylene copolymer (FEP) so as to cover an outer periphery of the heating element layer 30*b*.

The heat-fusion layer 30*d* is an adhesive layer for heat-fusing the heater wire 30 onto the base member 20. For example, it is formed by applying a thermoplastic curable adhesive, e.g., hot melt, to the outer periphery of the heating element layer 30*b*. The thermoplastic curable adhesive is apt to be impregnated into polyesters, e.g., ethylene terephthalate which constitutes the base member 20 and its bonding strength is extremely high. Therefore, if for example hot melt is used as the heat-fusion layer 30*d*, the heater wire 30 can be bonded and fixed easily and firmly to the base member 20.

Thus, by providing in the heater wire 30 a core 30*a* extremely high in tensile force and heat resistance, it becomes possible to obtain for the heater wire 30 superior bendability and tensile strength. The heater wire 30 is not limited to the one of the above configuration, but for example it may be a heater wire obtained by applying an insulation coating such as a coating of fluorine resin to the outer periphery of a heating wire formed of stainless steel or copper.

Although an example has been shown in this embodiment wherein the vehicle seat heater is disposed in a snowmobile, no limitation is made thereto. The vehicle seat heater of the present invention can be applied to seats in straddling type vehicles such as motorcycles, three-wheel vehicles and waterbikes, as well as automobiles, railways, aircraft and ships, further, massage chairs and sofas.

I claim:

1. A seat comprising:
   a cushion member;
   a seat heater having a planar base member disposed on the cushion member, a heater wire fixed to the base member, and a temperature control that controls the temperature of the heater wire; and,
   a skin material that covers both the cushion member and the seat heater,
   the seat heater being a seat built-in type vehicle seat heater disposed between the cushion member and the skin material covering the cushion member from above,
   the cushion member including a seat cushion surface portion for a sitting person, a recess formed in a surface located on the side opposite to the seat cushion surface portion, and a backrest surface portion that bears the waist of the sitting person on a vehicle body rear side of the seat cushion surface portion,
   the base member of the seat heater including a seat cushion surface-side portion disposed on the seat cushion surface portion, a backrest surface-side portion disposed on the backrest surface portion, and a connection surface portion disposed between the seat cushion surface-side portion and the backrest surface-side portion and connecting the seat cushion surface-side portion and the backrest surface-side portion to each other, the components of the base member being formed integrally, the heater wire comprising a seat cushion side heater wire disposed in the seat cushion surface-side portion, an insertion portion heater wire extended from the seat cushion side heater wire, a backrest surface-side heater wire disposed in the backrest surface-side portion, and a connection heater wire disposed in the connection surface portion to connect the seat cushion side heater wire and the backrest surface-side heater wire electrically to each other, at least a portion of the temperature control being connected to the insertion portion heater wire and disposed within the recess of the cushion member, and, the connection surface portion including a transfer suppresser that suppresses transfer of a pulling force imposed on the seat cushion surface-side portion upon shift of a load of the person to the backrest surface-side portion.

2. A seat according to claim 1, wherein the transfer suppresser is disposed between the seat cushion side portion and the backrest surface portion.

3. A seat according to claim 1, wherein the transfer suppresser is disposed in a space so as to pull over the skin material provided on the cushion member.

4. A seat according to claim 1, wherein the seat cushion surface-side portion is formed in a trapezoidal shape.

5. A seat according to claim 1, wherein:
the seat is a straddling type seat, and,
a part of the seating-side heater wire is disposed along side edges of the seat cushion surface-side portion.

6. A seat according to claim 1, wherein:
the recess is formed at an outside position in the seat width direction of the cushion member, and,
the transfer suppresser is disposed at an inside position in the seat width direction with respect to the recess.

7. A seat according to claim 6, wherein:
the cushion member includes a hole extending through the cushion member in the thickness direction of the cushion member, and,
the insertion portion heater wire is inserted through the hole.

8. A seat comprising:
a cushion member;
a seat heater having a planar base member disposed on the cushion member, a heater wire fixed to the base member, and a temperature control that controls the temperature of the heater wire; and,
a skin material that covers both the cushion member and the seat heater,
the seat heater being a vehicle seat heater,
the cushion member being formed in a straddling type and including a seat cushion surface portion for a sitting person, a recess formed in a surface located on the side opposite to the seat cushion surface portion, and a backrest surface portion that bears the waist of the sitting person on a vehicle body rear side of the seat cushion surface portion,
the base member of the seat heater including a seat cushion surface-side portion and a backrest surface-side portion,
the seat cushion surface-side portion being formed as a planar surface having stretchability and being disposed on the seat cushion surface portion, and the backrest surface-side portion being disposed on the backrest surface portion,
the heater wire comprising a seat cushion side heater wire, an insertion portion heat wire, and a backrest surface side heater wire, the seat cushion side heater wire being fixed substantially throughout the whole area of the base member and being disposed in the seat cushion surface-side portion, the insertion portion heat wire extending from the seat cushion side heater wire, and the backrest surface side heater wire being disposed in the backrest surface-side portion,
at least a portion of the temperature control being connected to the insertion portion heater wire and being disposed within the recess of the cushion member,
the seat cushion side heater wire including a plurality of first extending portions and a side portion that connects ends of the first extending portions to each other,
the backrest surface side heater wire including a plurality of second extending portions, the second extending portions being extended upwards of a vehicle body in a substantially right-left symmetric wavy shape and spaced a predetermined distance from each other,
the first and second extending portions being disposed so that the distance between mutually closest portions of the first extending portions is smaller than the distance between mutually closest portions of the second extending portions,
the cushion member includes a pulling-over slot that pulls over the base member between the seat cushion surface portion and the backrest surface portion,
the base member further includes a connection surface portion, the connection surface portion being provided between the seat cushion surface-side portion and the backrest surface-side portion and mounted in a bent state to the pulling-over slot,
the heater wire further includes a plurality of connection heater wires, the plurality of connection heater wires connecting the seat cushion side heater wire and the backrest surface side heater wire electrically to each other and being fixed to the connection surface portion, and,
the plurality of connection heater wires being disposed so that the distance between mutually closest portions of the plurality of connection heater wires is larger than the distance between mutually closest portions of the first extending portions.

9. A seat comprising:
a cushion member;
a seat heater having a planar base member disposed on the cushion member, a heater wire fixed to the base member, and a temperature control that controls the temperature of the heater wire; and,
a skin material that covers both the cushion member and the seat heater,
the seat heater being a vehicle seat heater,
the cushion member being formed in a straddling type and including a seat cushion surface portion for a sitting person, a recess formed in a surface located on the side opposite to the seat cushion surface portion, and a backrest surface portion that bears the waist of the sitting person on a vehicle body rear side of the seat cushion surface portion,
the base member of the seat heater including a seat cushion surface-side portion and a backrest surface-side portion,
the seat cushion surface-side portion being formed as a planar surface having stretchability and being disposed on the seat cushion surface portion, and the backrest surface-side portion being disposed on the backrest surface portion, the heater wire comprising a seat cushion side heater wire, an insertion portion heat wire, and a backrest surface side heater wire, the seat cushion side heater wire being fixed substantially throughout the whole area of the base member and being disposed in the seat cushion surface-side portion, the insertion portion heat wire extending from the seat cushion side heater wire, and the backrest surface side heater wire being disposed in the backrest surface-side portion, at least a portion of the temperature control being connected to the insertion portion heater wire and being disposed within the recess of the cushion member, the seat cushion side heater wire including a plurality of first extending portions and a side portion that connects ends of the first extending portions to each other, the backrest surface side heater wire including a plurality of second extending portions, the second extending portions being extended upwards of a vehicle body in a substantially right-left symmetric wavy shape and spaced a predetermined distance from each other, and, the first and second extending portions being disposed so that the distance between mutually closest portions of the first extending portions is smaller than the distance between mutually closest portions of the second extending portions, wherein the base member further includes an insertion portion extended backwards of the vehicle body from the seat cushion surface-side portion, with the temperature control being attached to the insertion portion, the insertion portion being inserted into the cushion member, and, the insertion portion heater wire is fixed to the insertion portion and is extended in a wavy shape backwards of the vehicle body.

10. A seat according to claim 8, wherein the second extending portions are disposed obliquely so that a spaced distance between the second extending portions in the transverse direction of the vehicle body becomes narrower from a lower to an upper portion of the vehicle body.

* * * * *